(12) United States Patent
Mitsunaga

(10) Patent No.: US 8,526,729 B2
(45) Date of Patent: Sep. 3, 2013

(54) IMAGE PROCESSING APPARATUS AND METHOD, AND PROGRAM

(75) Inventor: Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 13/039,973

(22) Filed: Mar. 3, 2011

(65) Prior Publication Data

US 2011/0222767 A1    Sep. 15, 2011

(30) Foreign Application Priority Data

Mar. 10, 2010  (JP) ................. P2010-053864

(51) Int. Cl.
*G06K 9/00*  (2006.01)

(52) U.S. Cl.
USPC ............. 382/167; 382/168; 382/274

(58) Field of Classification Search
USPC ................ 382/167, 168, 169, 274
See application file for complete search history.

(56) References Cited

U.S. PATENT DOCUMENTS

| | | | | |
|---|---|---|---|---|
| 6,111,980 A | * | 8/2000 | Sano et al. | 382/167 |
| 7,199,840 B2 | * | 4/2007 | Shiota | 348/678 |
| 7,636,472 B2 | * | 12/2009 | Maruoka | 382/167 |

FOREIGN PATENT DOCUMENTS

| | | |
|---|---|---|
| EP | 2131569 | 12/2009 |
| JP | 2009-177558 | 8/2009 |

* cited by examiner

*Primary Examiner* — Phuoc Tran

(74) *Attorney, Agent, or Firm* — Finnegan, Henderson, Farabow, Garrett & Dunner, LLP

(57) ABSTRACT

An image processing apparatus includes a histogram calculation unit configured to calculate a histogram of a luminance value for each spatial block obtained by dividing an input image in a spatial direction, a gray scale correction coefficient calculation unit configured to calculate a gray scale correction coefficient used for correction of the gray scale of a luminance value for each bin of the histogram, and a gray scale correction unit configured to perform gray scale correction of a luminance value of a target pixel based on the gray scale correction coefficient of the bin to which the target pixel of the input image belongs and the gray scale correction coefficient of a bin adjacent to the bin to which the target pixel belongs in the spatial direction and a luminance direction.

10 Claims, 33 Drawing Sheets

FIG. 4

| G | B | G | B |
|---|---|---|---|
| R | G | R | G |
| G | B | G | B |
| R | G | R | G |

FIG. 34

| G | B | G | B |
|---|---|---|---|
| R | G | R | G |
| G | B | G | B |
| R | G | R | G |

IMAGE PROCESSING APPARATUS AND METHOD, AND PROGRAM

BACKGROUND OF THE INVENTION

1. Field of the Invention

The present invention relates to an image processing apparatus and method and a program, and, more particularly, to an image processing apparatus and method and a program, which are suitably used when image gray scale correction is performed.

2. Description of the Related Art

In the related art, as one image processing technology, without changing a detail component representative of texture, a gray scale correction process of compressing a luminance difference of another component is known (for example, see Japanese Unexamined Patent Application Publication No. 2009-177558).

Here, the outline of a gray scale correction process of Japanese Unexamined Patent Application Publication No. 2009-177558 will be described with reference to FIG. 1.

A luminance region information calculation unit 11 obtains a base value which is a luminance value of a base of a dark luminance side and a light luminance side of a histogram of a luminance value $L(nl)(p)$ of an input image and stores such a base value in a luminance region information memory 12 as luminance region information. A block histogram calculation unit 13 divides the input image into a plurality of blocks in a spatial direction and a luminance direction, and calculates and stores a block histogram representing the number (frequency count) of pixels belonging to each block for each frame in a block histogram memory 14. A block integration value calculation unit 15 calculates and stores the integration value (total sum) of luminance values of pixels belonging to each block of the above-described input image for each frame in a block integration value memory 16.

A weighted sum-of-products unit 17 calculates a general luminance value $Ll(nl)(p)$ representing approximate lightness of a subject to which each pixel of the input image belongs, based on the luminance value $L(nl)(p)$ of the input image, the block histogram, and the block integration value. A tone curve calculation unit 18 calculates a tone curve for each pixel based on the luminance region information and the general luminance value $Ll(nl)(p)$ and stores the tone curve in a tone curve memory 19. A mapping unit 20 compresses (corrects) the gray scale of the general luminance value $Ll(nl)(p)$ based on the tone curve and supplies an obtained general luminance value $Lcl(nl)(p)$ to a contrast correction unit 22. The mapping unit 21 compresses (corrects) the gray scale of the luminance value $L(nl)(p)$ of the input image based on the tone curve and supplies an obtained luminance value $Lc(nl)(p)$ to the contrast correction unit 22. The contrast correction unit 22 corrects the contrast of the luminance image including the luminance value $Lc(nl)(p)$ based on the general luminance value $Lcl(nl)(p)$, the luminance value $Lc(nl)(p)$ and the tone curve and outputs a luminance value $Lu(nl)(p)$ obtained as the result.

SUMMARY OF THE INVENTION

However, in the gray scale correction process of Japanese Unexamined Patent Application Publication No. 2009-177558, in order to calculate the general luminance value $Ll(nl)(p)$, the block histogram and the block integration value of one frame are held and thus the amount of memory necessary is increased.

In the gray scale correction process of Japanese Unexamined Patent Application Publication No. 2009-177558, in order to calculate the general luminance value $Ll(nl)(p)$ of each pixel, a weighted sum-of-products operation of the block histogram, a weighted sum-of-products operation of the block integration value and a division of such results is performed. In addition, the tone curve is calculated based on the general luminance value $Ll(nl)(p)$ for each pixel. As a result, the computational complexity is increased.

It is desirable to perform gray scale correction processing with a small amount of memory and a low computational complexity.

According to an embodiment of the present invention, there is provided an image processing apparatus including: a histogram calculation means for calculating a histogram of a luminance value for each spatial block obtained by dividing an input image in a spatial direction; a gray scale correction coefficient calculation means for calculating a gray scale correction coefficient used for correction of the gray scale of a luminance value for each bin of the histogram; and a gray scale correction means for performing gray scale correction of a luminance value of a target pixel based on the gray scale correction coefficient of the bin to which the target pixel of the input image belongs and the gray scale correction coefficient of a bin adjacent to the bin to which the target pixel belongs in the spatial direction and a luminance direction.

The gray scale correction coefficient calculation means may include a reference luminance value calculation means for calculating a luminance value obtained by correcting a representative value of the luminance value of the bin in a direction in which a frequency count of the histogram is increased when viewed from the corresponding bin, as a reference luminance value, and a coefficient calculation means for calculating the gray scale correction coefficient for each bin, based on an output luminance value for the reference luminance value of a predetermined gray scale correction characteristic function for outputting an output luminance value, in which the gray scale of an input luminance value is corrected, and the reference luminance value.

The reference luminance value calculation means may calculate a barycenter of the luminance value of the corresponding bin as the reference luminance value based on the frequency count of the corresponding bin and the frequency count of the bin adjacent to the corresponding bin in the spatial direction and the luminance direction.

The reference luminance value calculation means may calculate a primary differential coefficient of the luminance direction of the histogram and calculate the luminance value obtained by correcting the representative value of the luminance value of the corresponding bin in the direction in which the frequency count of the histogram is increased when viewed from the bin based on the primary differential coefficient, as the reference luminance value.

The reference luminance value calculation means may calculate a cumulative histogram function for the histogram and an inverse function of the cumulative histogram function, for each spatial block, calculate a monotonically increasing function passing through the vicinity of the coordinates of the cumulative histogram function for a luminance value in which the histogram becomes a maximum and the minimum value and the maximum value of a luminance value, as a luminance modulation function, for each spatial block, and calculate the reference luminance value by correcting the representative value of the luminance value of the corresponding bin based on the luminance modulation function and the inverse function of the cumulative histogram function.

The coefficient calculation means may calculate the gray scale correction characteristic function passing through a minimum value and the coordinates in which a predetermined output luminance value is assigned to a luminance value in which the cumulative count of the histogram becomes a predetermined value and a maximum value of a luminance value.

The gray scale correction means may interpolate the gray scale correction coefficient of the luminance value and the position of the target pixel based on the gray scale correction coefficients of the bin to which the target pixel belongs and the bin adjacent to the bin to which the target pixel belongs in the spatial direction and the luminance direction and perform gray scale correction of the luminance value of the target pixel based on the interpolated gray scale correction coefficient.

According to another embodiment of the present invention, there is provided an image processing method of an image processing apparatus for performing gray scale correction of a luminance value of an input image, including the steps of: calculating a histogram of a luminance value for each spatial block obtained by dividing the input image in a spatial direction; calculating a gray scale correction coefficient used for correction of the gray scale of a luminance value for each bin of the histogram; and performing gray scale correction of a luminance value of a target pixel based on the gray scale correction coefficient of the bin to which the target pixel of the input image belongs and the gray scale correction coefficient of a bin adjacent to the bin to which the target pixel belongs in the spatial direction and a luminance direction.

According to another embodiment of the present invention, there is provided a program for executing, on a computer, a process including the steps of: calculating a histogram of a luminance value for each spatial block obtained by dividing the input image in a spatial direction; calculating a gray scale correction coefficient used for correction of the gray scale of a luminance value for each bin of the histogram; and performing gray scale correction of a luminance value of a target pixel based on the gray scale correction coefficient of the bin to which the target pixel of the input image belongs and the gray scale correction coefficient of a bin adjacent to the bin to which the target pixel belongs in the spatial direction and a luminance direction.

According to an embodiment of the present invention, a histogram of a luminance value for each spatial block obtained by dividing the input image in a spatial direction is calculated, a gray scale correction coefficient used for correction of the gray scale of a luminance value for each bin of the histogram is calculated, and gray scale correction of a luminance value of a target pixel is performed based on the gray scale correction coefficient of the bin to which the target pixel of the input image belongs and the gray scale correction coefficient of a bin adjacent to the bin to which the target pixel belongs in the spatial direction and a luminance direction.

According to embodiments of the present invention, it is possible to perform gray scale correction processing with a small amount of memory and a low computational complexity.

BRIEF DESCRIPTION OF THE DRAWINGS

FIG. 4 is a diagram showing an arrangement example of pixels of a mosaic image;

FIG. 34 is a diagram illustrating a position of an obtained luminance value.

DESCRIPTION OF THE PREFERRED EMBODIMENTS

Hereinafter, modes (hereinafter, referred to as embodiments) for carrying out the present invention will be described. The description will be given in the following order.

1. First Embodiment (Example of Calculating Gray Scale Correction Coefficient by Barycenter of Luminance Value of Each Bin of Block Histogram of Each Spatial Block)

2. Second Embodiment (Example of Calculating Gray Scale Correction Coefficient Using Primary Differential Coefficient Function of Block Histogram of Each Spatial Block)

3. Third Embodiment (Example of Calculating Gray Scale Correction Coefficient Using Inverse Function of Luminance Modulation Function and Cumulative Histogram Function of Each Spatial Block)

4. Modified Example

1. First Embodiment

Configuration Example of Digital Video Camera

Figure 1:
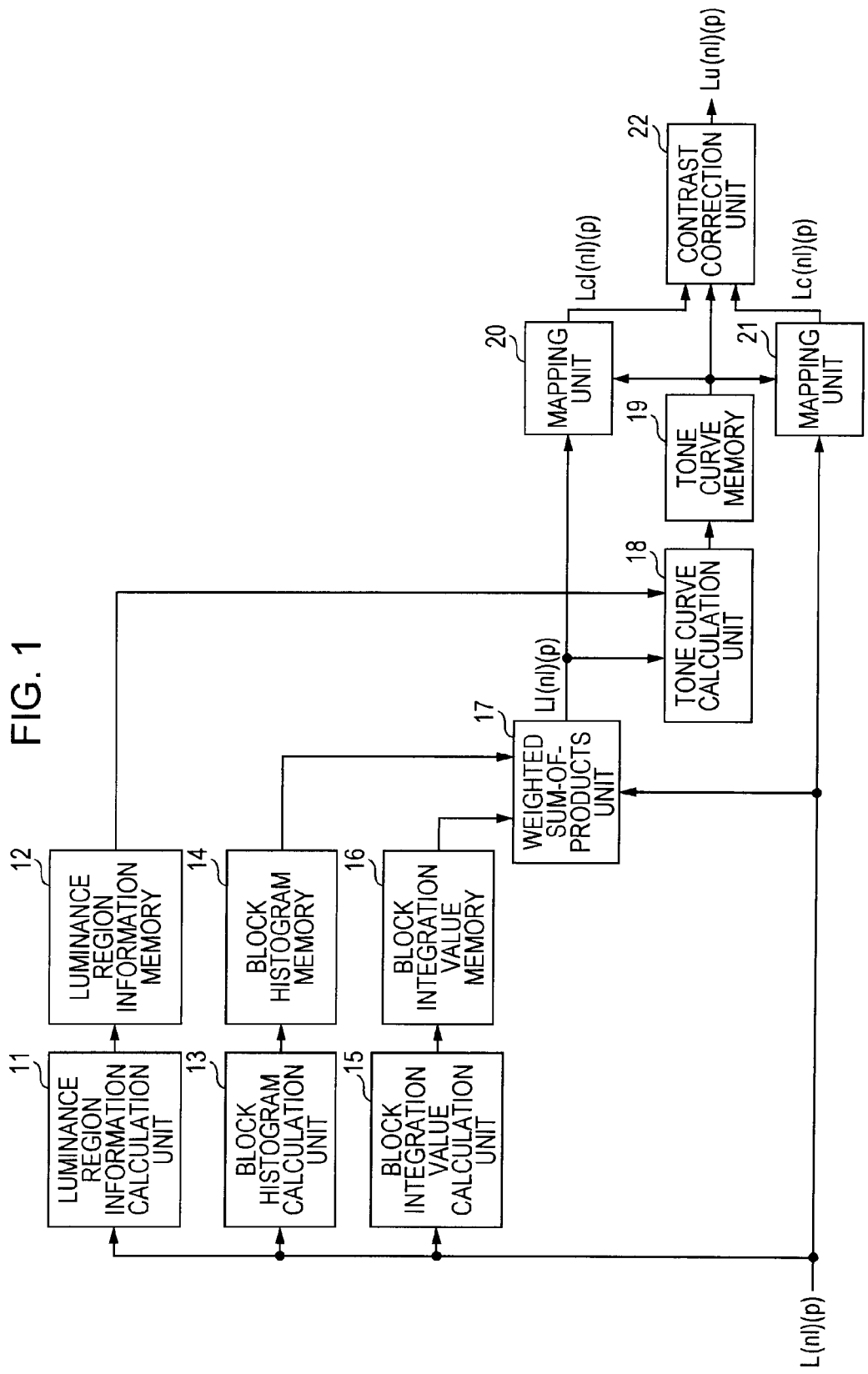
FIG. 1 is a diagram illustrating the outline of a gray scale correction process of the related art.
Figure 2:
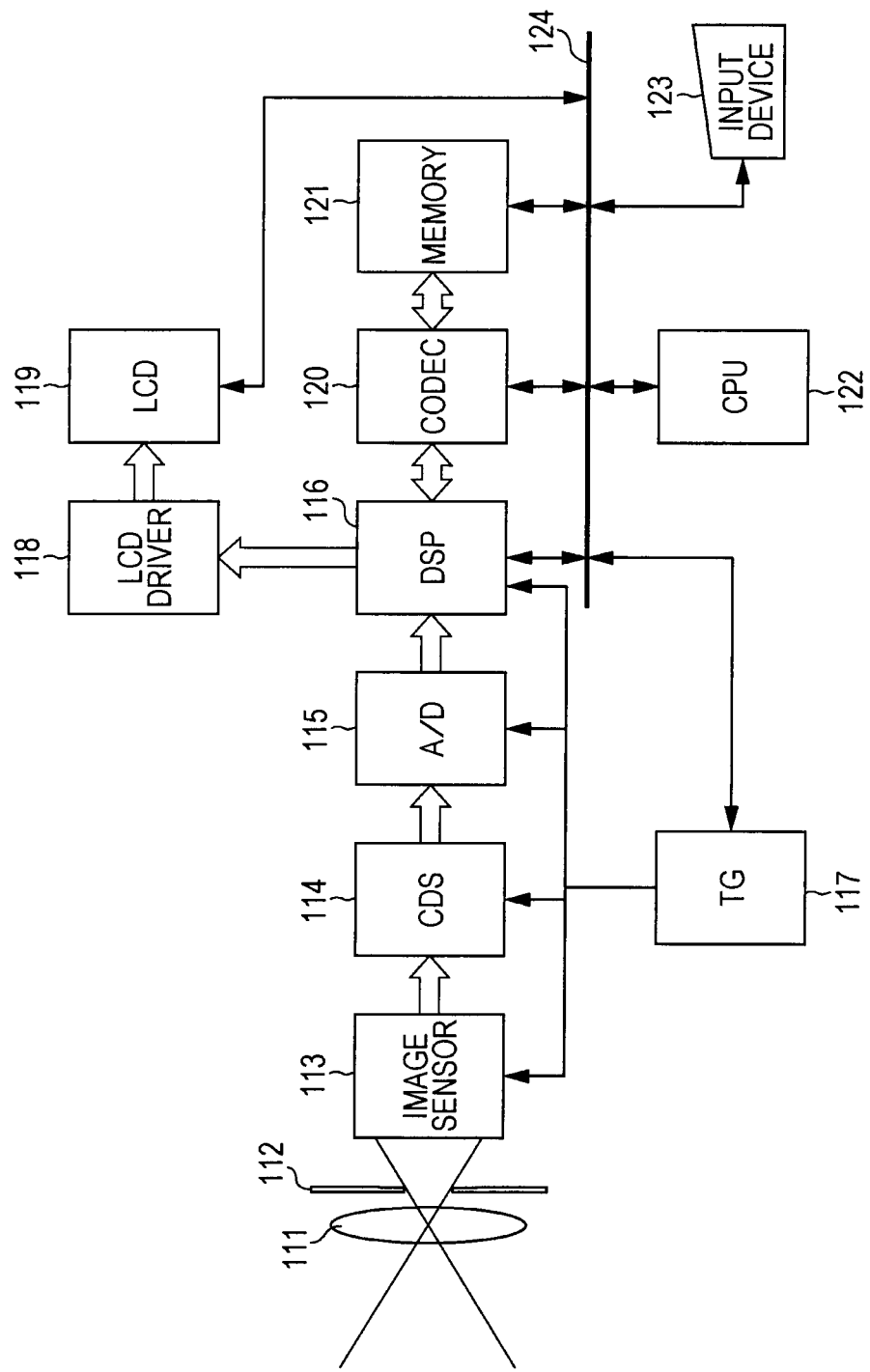
FIG. 2 is a block diagram showing a digital video camera according to a first embodiment of the present invention.

FIG. 2 is a block diagram showing a digital video camera according to a first embodiment of the present invention. The digital video camera includes a lens 111, a diaphragm 112, an image sensor 113, a correlated double sampling circuit (CDS) 114, an Analog/Digital (A/D) converter 115, a Digital Signal Processor (DSP) block 116, a timing generator (TG) 117, a Liquid Crystal Display (LCD) driver 118, an LCD 119, a Compression/Decompression (CODEC) 120, a memory 121, a Central Processing Unit (CPU) 122, an input device 123, and a bus 124. The DSP block 116 is a block including a signal processor (for example, digital signal processing (DSP)) and a memory such as a Random Access Memory (RAM) for holding image data, a processor executes a predetermined program so as to perform the image processing described below. Hereinafter, the DSP block 116 is referred simply to as the DSP 116.

Incident light from a subject passing through an optical system including the lens 111, the diaphragm 112 and the like reaches each light receiving element of an image pickup surface of the image sensor 113 and is converted into an electrical signal by photoelectric conversion of the light receiving element. The electrical signal output from the image sensor 113 is digitalized using the A/D converter 115 after removing noise using the correlated double sampling circuit 114 and the digitalized image data is temporarily stored in a memory of the DSP 116. The timing generator 117 controls a signal processing system including the correlated double sampling circuit 114, the A/D converter 115 and the DSP 116 such that the image data is input at a constant frame rate. That is, a stream of the image data is supplied to the DSP 116 at a constant frame rate.

In addition, the image sensor 113 has a dynamic range wider than that of an image sensor of a general Charge Coupled Device (CCD) or the like and picks up an image from a dark part to a light part of a subject without saturation or noise generation. Accordingly, the A/D converter 115 converts the input electrical signal into image data, the number of gray scales (for example, the number of gray scales which may be expressed by data of about 14 to 16 bits) of which is greater than the number of gray scales (for example, the number of gray scales which may be expressed by data of about 10 to 12 bits) of the general digital video camera.

The DSP 116 performs the below-described image processing with respect to the image data such that the dynamic range of the image data becomes, for example, a dynamic range which may be displayed by the LCD 119 and supplies the image-processed image data to the LCD driver 118 or the CODEC 120 as necessary.

The LCD driver 118 converts the image data supplied from the DSP 116 into an analog image signal. The LCD driver 118 supplies the analog image signal to the LCD 119 which is a finder of the digital video camera and displays an image based on the image signal.

The CODEC 120 encodes the image data supplied from the DSP 116 using a predetermined method and records the encoded image data in the memory 121 including a semiconductor, a magnetic recording medium, a magneto-optical recording medium, an optical recording medium, or the like.

The CPU 122 controls the overall processing of the digital video camera based on an input instruction or the like, for example, when a user manipulates the input device 123 including a manipulation button such as a shutter button. The DSP 116, the timing generator 117, the CODEC 120, the memory 121, the LCD 119, the CPU 122 and the input device 123 are connected to each other via the bus 124.

[Configuration Example of Function Realized by DSP Block of Digital Camera]

Figure 3:
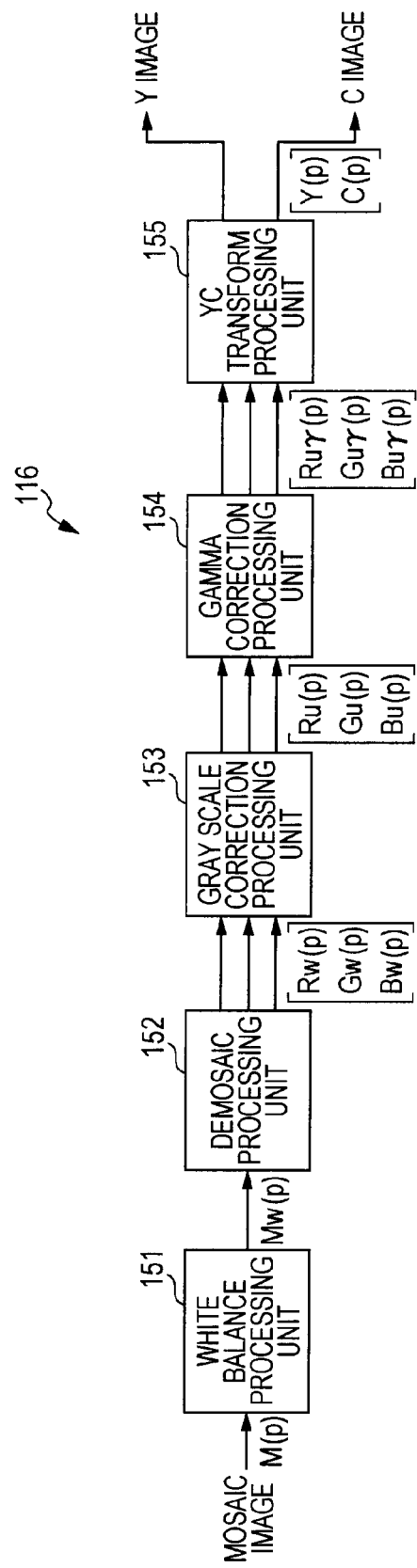
FIG. 3 is a block diagram showing a configuration example of a DSP block.

FIG. 3 is a block diagram showing a configuration example of a function realized by enabling an internal processor (arithmetic unit) of the DSP 116 to execute a predetermined program. The internal processor of the DSP 116 executes the predetermined program so as to realize a function including a white balance processing unit 151, a demosaic processing unit 152, a gray scale correction processing unit 153, a gamma correction processing unit 154 and a YC transform processing unit 155.

The white balance processing unit 151 acquires a mosaic image which is image data such as a moving image A/D converted by the A/D converter 115. The mosaic image is an image in which data corresponding to several color components among R, G and B is stored in one pixel and, for example, pixels are arranged along a color array called a Bayer array shown in FIG. 4, and is also referred to as RAW data.

Figure 4:
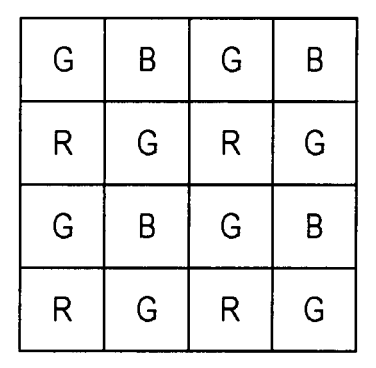

In FIG. 4, one square indicates one pixel and characters R, G and B in the square respectively indicate a pixel of R, a pixel of G and a pixel of B. The pixels of G are arranged in a checkered shape and the pixels of R and the pixels of B are alternately arranged in each row in the remaining parts.

Returning to the description of FIG. 3, the white balance processing unit 151 applies an appropriate coefficient to a pixel value of each pixel of the acquired mosaic image and adjusts white balance of the mosaic image such that color balance of an achromatic part of a subject actually becomes achromatic. The white balance processing unit 151 supplies the mosaic image, the white balance of which is adjusted, to the demosaic processing unit 152. Hereinafter, the mosaic image, the white balance of which is adjusted, is denoted by Mw.

The demosaic processing unit 152 performs demosaic processing with respect to the mosaic image Mw supplied from the white balance processing unit 151 such that one pixel has all R, G and B components. Therefore, three pieces of image data of an R image, a G image and a B image corresponding to three color components of R, G and B are generated. The demosaic processing unit 152 supplies the three generated pieces of image data of the R image, G image and B image to the gray scale correction processing unit 153.

In addition, hereinafter, three pieces of image data of the R image, the G image and the B image are also referred to as an RGB image. Hereinafter, a pixel value of a pixel position p of a mosaic image is denoted by M(p). In addition, a pixel value of a pixel position p of image data subjected to the demosaic processing is denoted by [$R_w(p)$, $G_w(p)$, $B_w(p)$]. Here, $R_w(p)$ denotes a pixel value of an R component, $G_w(p)$ denotes a pixel value of a G component, and $B_w(p)$ denotes a pixel value of a B component.

The gray scale correction processing unit 153 performs gray scale correction processing with respect to the RGB image and supplies the RGB image subjected to gray scale correction processing to the gamma correction processing unit 154. In addition, hereinafter, a pixel value of a pixel position p of image data subjected to gray scale correction processing is denoted by [Ru(p), Gu(p), Bu(p)]. Here, Ru(p) denotes a pixel value of an R component, Gu(p) denotes a pixel value of a G component, and Bu(p) denotes a pixel value of a B component.

The gamma correction processing unit 154 performs gamma correction with respect to the RGB image subjected to gray scale transformation. The gamma correction processing unit 154 supplies the RGB image subjected to gamma correction to the YC transform processing unit 155. In addition, hereinafter, a pixel value of a pixel position p of image data subjected to gamma correction is denoted by [Ruγ(p), Guγ(p), Buγ(p)]. Here, Ruγ(p) denotes a pixel value of an R component, Guγ(p) denotes a pixel value of a G component, and Buγ(p) denotes a pixel value of a B component.

The YC transform processing unit 155 performs YC matrix processing with respect to the RGB image subjected to gamma correction and performs band limit with respect to a chroma component so as to generate a Y image including a luminance component (Y component) and a C image including a color difference component (Cb or Cr component). The YC transform processing unit 155 supplies the generated Y image and C image to the LCD driver 118 or the CODEC 120 as necessary. In addition, hereinafter, a pixel value of a pixel position p of image data output from the YC transform processing unit 155 is denoted by [Y(p), C(p)]. Here, Y(p) denotes a value of a luminance component of a Y image and C(p) denotes a value of a color difference component of a C image. Hereinafter, the Cb component of the C image is denoted by Cb(p) and the Cr component of the C image is denoted by Cr(p).

[Configuration Example of Function of Gray Scale Correction Processing Unit]

Figure 5:
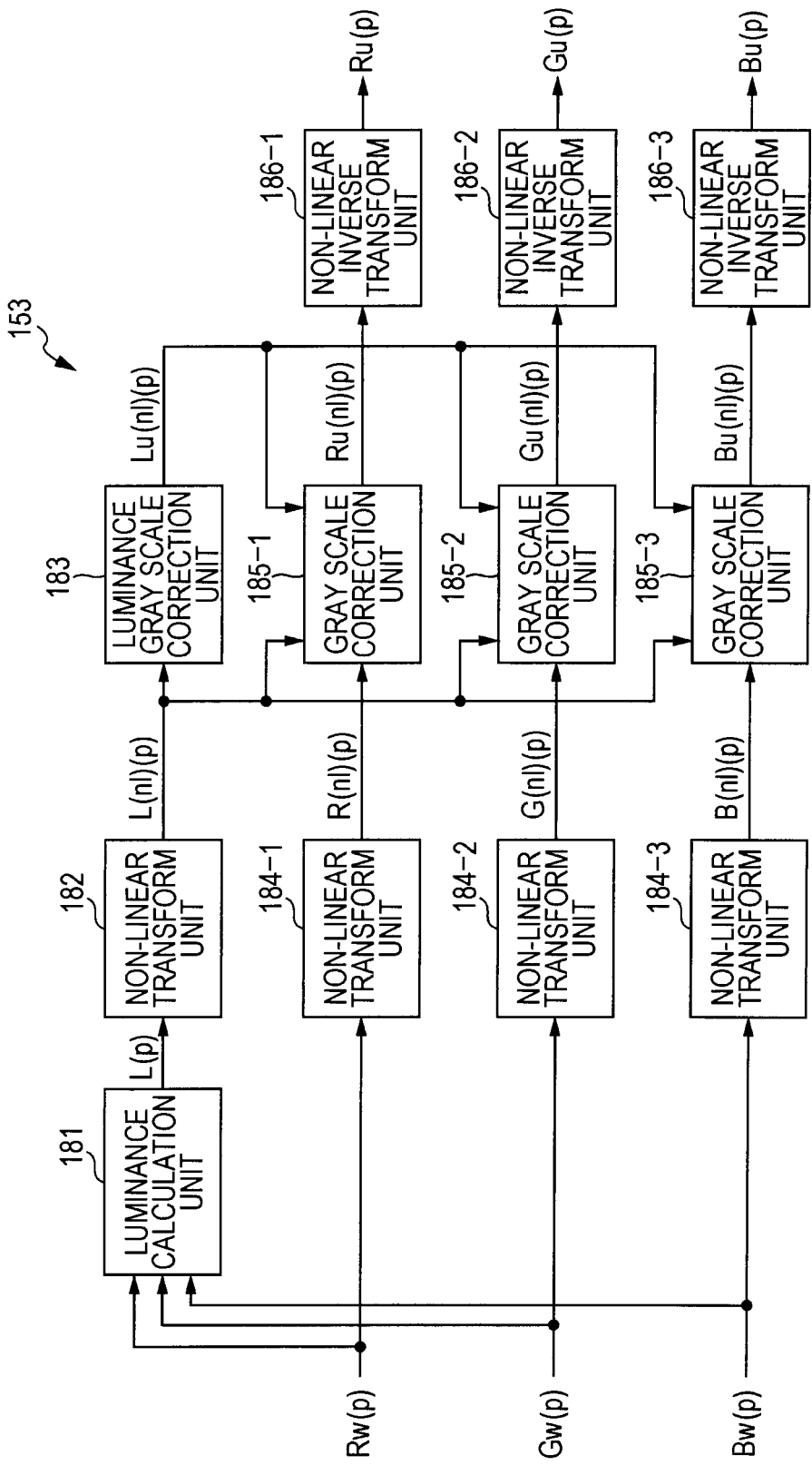
FIG. 5 is a block diagram showing a configuration example of a gray scale correction processing unit.

FIG. 5 is a block diagram showing a configuration example of a function of the gray scale correction processing unit 153. The gray scale correction processing unit 153 includes a luminance calculation unit 181, a non-linear transform unit 182, a luminance gray scale correction unit 183, a non-linear transform unit 184-1 to a non-linear transform unit 184-3, a gray scale correction unit 185-1 to a gray scale correction unit 185-3, and a non-linear inverse transform unit 186-1 to a non-linear inverse transform unit 186-3.

The luminance calculation unit 181 calculates a value (luminance value L(p)) of a luminance component corresponding to a pixel position from the pixel values Rw(p), Gw(p) and Bw(p) of the RGB image supplied from the demosaic processing unit 152 and supplies the value to the non-linear transform unit 182. The non-linear transform unit 182 non-linearly transforms the luminance value L(p) from the luminance calculation unit 181 and supplies the resultingly obtained luminance value L(nl)(p) and the pixel position p thereof to the luminance gray scale correction unit 183 and the gray scale correction unit 185-1 to the gray scale correction unit 185-3.

The luminance gray scale correction unit 183 compresses the gray scale of the luminance value L(nl)(p) from the non-linear transform unit 182 so as to perform gray scale correction of the luminance value L(nl)(p) and supplies the luminance value Lu(nl)(p) obtained by gray scale correction to the gray scale correction unit 185-1 to the gray scale correction unit 185-3.

Each of the non-linear transform unit 184-1 to the non-linear transform unit 184-3 non-linearly transforms each of the pixel values Rw(p), Gw(p) and Bw(p) of the RGB image supplied from the demosaic processing unit 152. Each of the non-linear transform unit 184-1 to the non-linear transform unit 184-3 supplies each of the pixel values R(nl)(p), G(nl)(p) and B(nl)(p) obtained by non-linear transform to the gray scale correction unit 185-1 to the gray scale correction unit 185-3. Hereinafter, each of the non-linear transform units 184-1 to the non-linear transform unit 184-3 are merely referred to as the non-linear transform unit 184 if they are not necessary to be distinguished.

Each of the gray scale correction unit 185-1 to the gray scale correction unit 185-3 corrects the gray scale of each of the pixel values R(nl)(p), G(nl)(p) and B(nl)(p) from the non-linear transform unit 184-1 to the non-linear transform unit 184-3 using the luminance value L(nl)(p) from the non-linear transform unit 182 and the luminance value Lu(nl)(p) from the luminance gray scale correction unit 183. Each of the gray scale correction unit 185-1 to the gray scale correction unit 185-3 supplies each of the pixel values Ru(nl)(p), Gu(nl)(p) and Bu(nl)(p) obtained by gray scale correction to each of the non-linear inverse transform unit 186-1 to the non-linear inverse transform unit 186-3.

Each of the non-linear inverse transform unit 186-1 to the non-linear inverse transform unit 186-3 performs non-linear inverse transform which is the inverse transform of the non-linear transform by the non-linear transform unit 184 of the pixel values Ru(nl)(p), Gu(nl)(p) and Bu(nl)(p) from the gray scale correction unit 185-1 to the gray scale correction unit 185-3. Each of the non-linear inverse transform unit 186-1 to the non-linear inverse transform unit 186-3 supplies each of the pixel values Ru(p), Gu(p) and Bu(p) obtained by non-linear inverse transform to the gamma correction processing unit 154.

In addition, the gray scale correction unit 185-1 to the gray scale correction unit 185-3 are merely referred to the gray scale correction unit 185 if they are not necessary to be distinguished. In addition, hereinafter, the non-linear inverse transform unit 186-1 to the non-linear inverse transform unit 186-3 are merely referred to as the non-linear inverse transform unit 186 if they are not necessary to be distinguished.

[Configuration Example of Function of Luminance Gray Scale Correction Unit]

Figure 6:
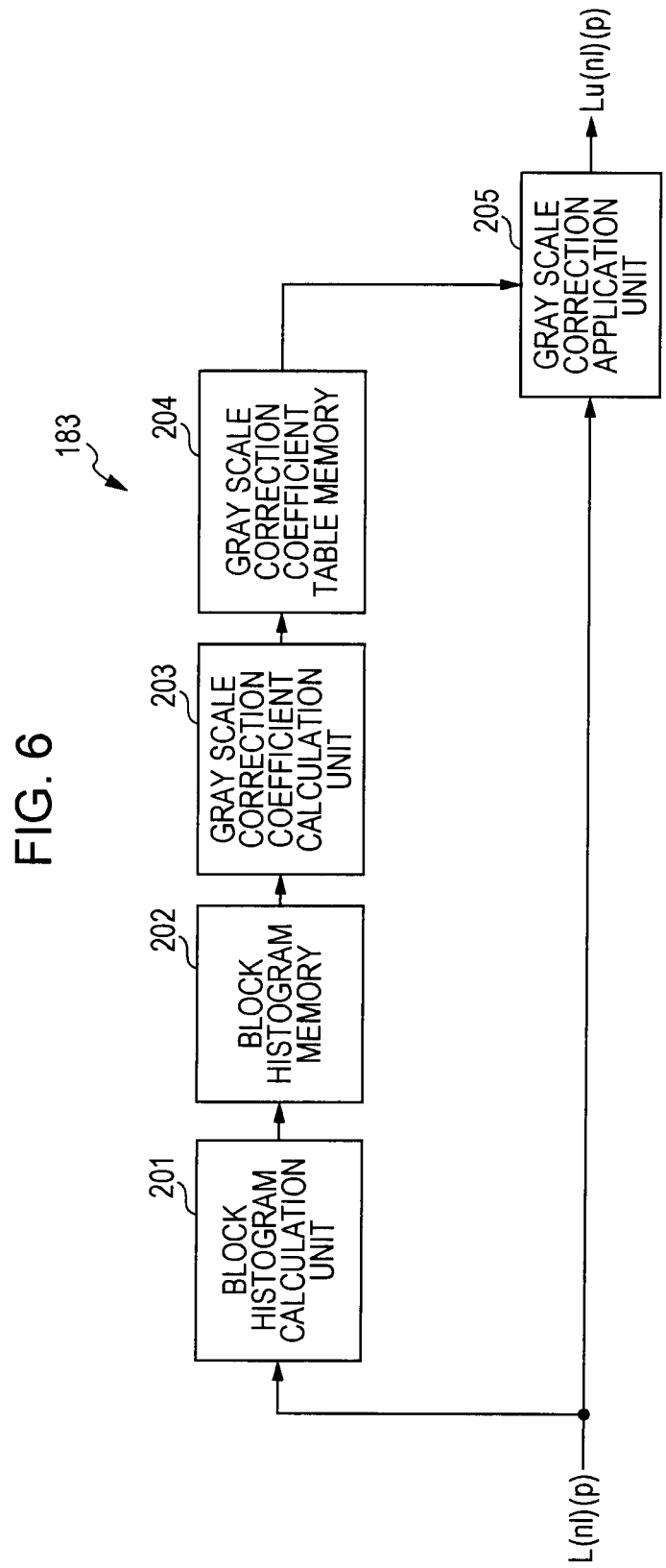
FIG. 6 is a block diagram showing a configuration example of a luminance gray scale correction unit.

FIG. 6 is a block diagram showing a configuration example of the function of the luminance gray scale correction unit 183 of FIG. 5. The luminance gray scale correction unit 183 includes a block histogram calculation unit 201, a block histogram memory 202, a gray scale correction coefficient calculation unit 203, a gray scale correction coefficient table memory 204, and a gray scale correction application unit 205.

The block histogram calculation unit 201 divides a luminance image corresponding to one frame including the luminance value L(nl)(p) supplied from the non-linear transform unit 182 vertically and horizontally into H by W spatial blocks. The block histogram calculation unit 201 divides a luminance range from the minimum value to the maximum value of a luminance value taken by a luminance image into D bin (luminance ranges) and counts the number (frequency count) of pixels belonging to each bin for each spatial block. A block histogram which is a histogram of a luminance value having D bins is calculated for each spatial block. The block histogram calculation unit 201 stores the calculated block histogram in the block histogram memory 202.

The gray scale correction coefficient calculation unit 203 reads the block histogram of each spatial block from the block histogram memory 202 and a gray scale correction coefficient used for gray scale correction of the luminance value L(nl)(p) for each bin of each block histogram based on the block histogram is calculated. The gray scale correction coefficient calculation unit 203 stores a gray scale correction coefficient table which is a list of gray scale correction coefficient of each bit of each block histogram in the gray scale correction coefficient table memory 204.

The gray scale correction application unit 205 reads the gray scale correction coefficient table from the gray scale correction coefficient table memory 204 and corrects the gray scale of the luminance value L(nl)(p) supplied from the non-linear transform unit 182 based on the gray scale correction coefficient represented by the gray scale correction coefficient table. The gray scale correction application unit 205 supplies the luminance value Lu(nl)(p) obtained by gray scale correction to the gray scale correction unit 185.

In addition, hereinafter, a pixel to be processed, for example, a pixel of a luminance value L(nl)(p) supplied to the luminance gray scale correction unit 183 is also referred to as a target pixel.

[Configuration Example of Function of Block Histogram Calculation Unit]

Figure 7:
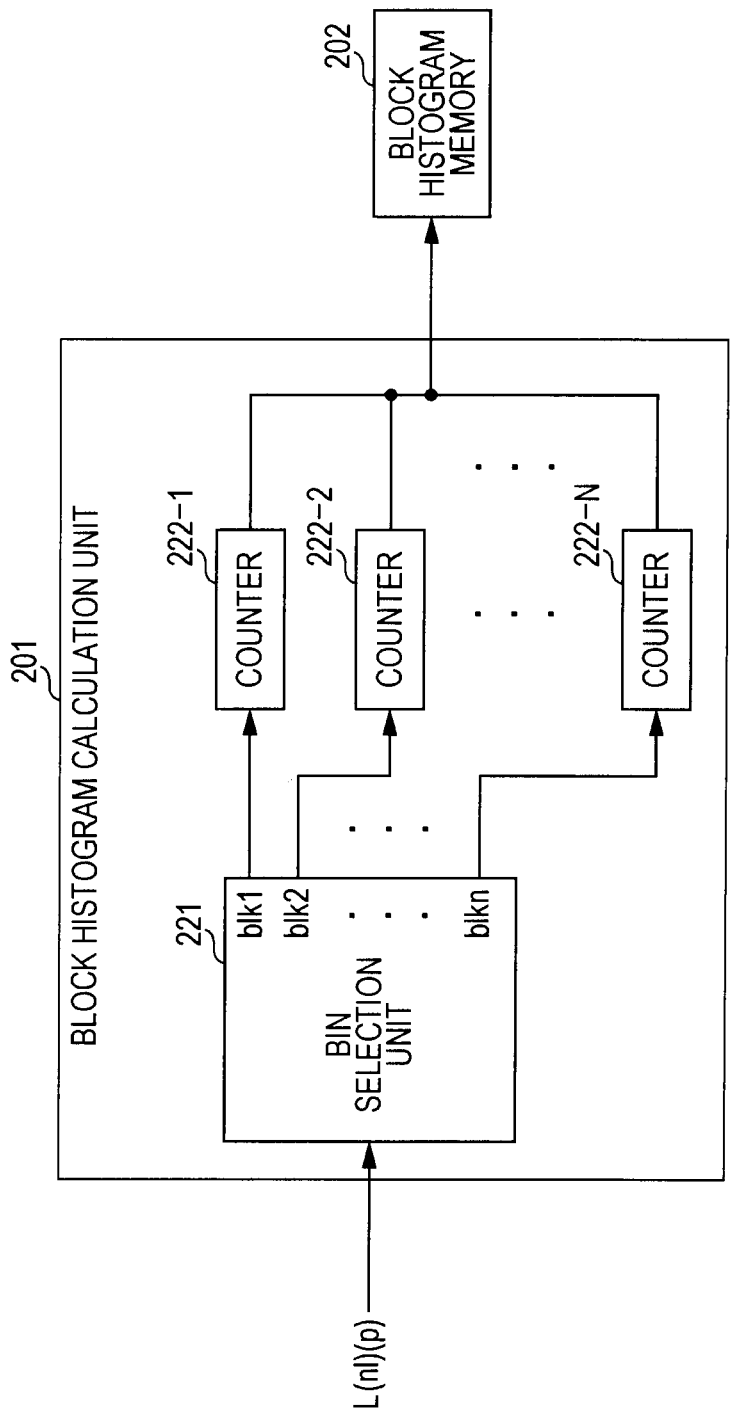
FIG. 7 is a block diagram showing a configuration example of a block histogram calculation unit.

FIG. 7 is a block diagram showing a configuration example of the function of the block histogram calculation unit 201 of FIG. 6. The block histogram calculation unit 201 includes a bin selection unit 221, and a counter 222-1 to a counter 222-N.

The bin selection unit 221 specifies a spatial block, to which the target pixel belongs, from the position p of the target pixel supplied from non-linear transform unit 182. In addition, the bin selection unit 221 specifies a bin, to which the target pixel belongs, in the block histogram of the specified spatial block from the luminance value L(nl)(p) of the target pixel. The counter 222-1 to the counter 222-N (N=H× W×D) are provided one by one in respective bins of respective block histograms. The bin selection unit 221 increases the value of the counter corresponding to the specified bin by 1 among the counter 222-1 to the counter 222-N corresponding to the respective bins.

Each of the counter 222-1 to the counter 222-N holds the frequency count of the pixel belonging to the bin of the corresponding block histogram. That is, each of the counter 222-1 to the counter 222-N holds the number of pixels within the luminance range, to which the luminance corresponds, among the pixels within the corresponding spatial block. Each of the counter 222-1 to the counter 222-N increases the held value according to an instruction of the bin selection unit 221. Each of the counter 222-1 to the counter 222-N stores the held value in the block histogram memory 202 as a frequency count of each bin of each block histogram, if the counter of the pixels of the luminance image corresponding to one frame is finished. In addition, hereinafter, the counter 222-1 to the counter 222-N are simply referred to as the counter 222, if they are not necessary to be distinguished.

[Configuration Example of Function of Gray Scale Correction Coefficient Calculation Unit]

Figure 8:
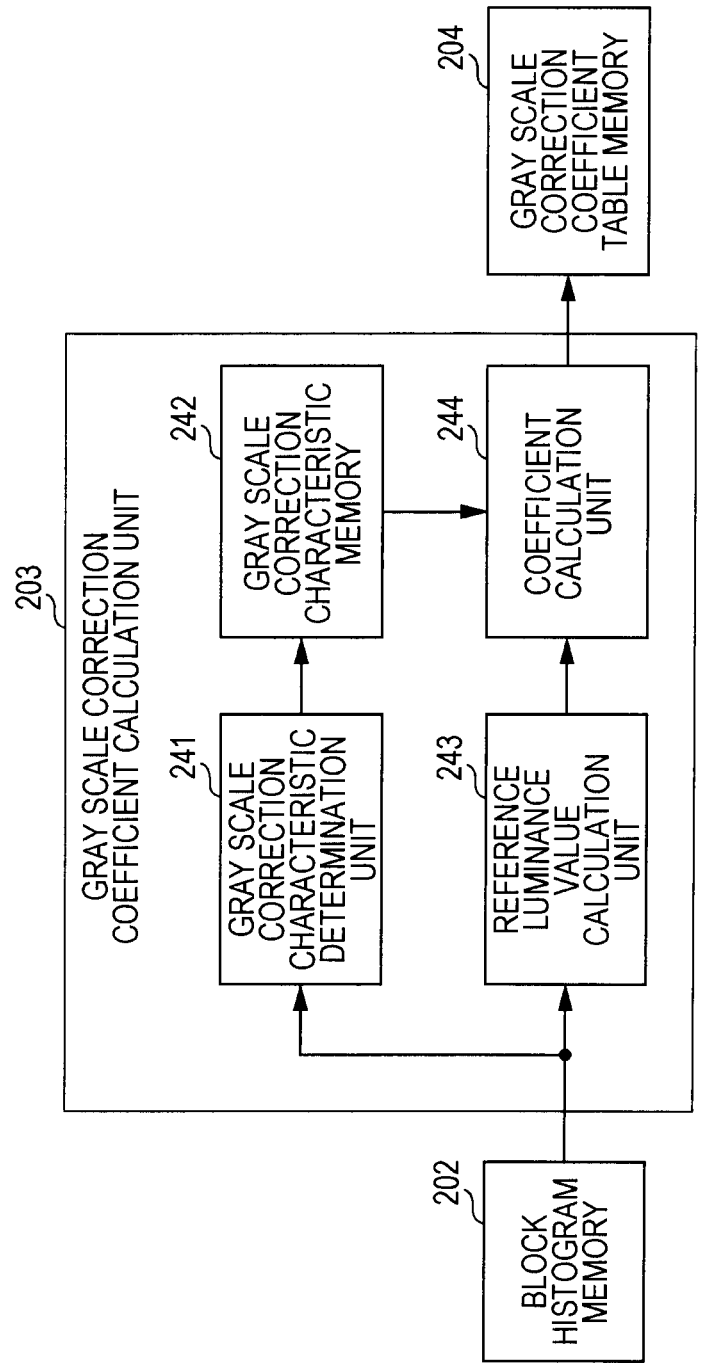
FIG. 8 is a block diagram showing a configuration example of a gray scale correction coefficient calculation unit.

FIG. 8 is a block diagram showing a configuration example of the function of the gray scale correction coefficient calculation unit 203 of FIG. 6. The gray sale correction coefficient calculation unit 203 includes a gray scale correction characteristic determination unit 241, a gray scale correction characteristic memory 242, a reference luminance value calculation unit 243 and a coefficient calculation unit 244.

The gray scale correction characteristic determination unit 241 reads the block histogram of each spatial block from the block histogram memory 202. The gray scale correction characteristics determination unit 241 sets a spline control point for calculating a gray scale correction characteristic function used for gray scale correction of the luminance value for each spatial block based on the block histogram. In addition, the gray scale correction characteristic function is a function defining the characteristics of gray scale correction as described below with respect to FIG. 17, and outputs an output luminance value in which the gray scale of an input luminance value is corrected. The gray scale correction characteristic determination unit 241 stores the spline control point for each set spatial block in the gray scale correction characteristic memory 242.

The reference luminance value calculation unit 243 reads the block histogram of each spatial block from the block histogram memory 202. The reference luminance value calculation unit 243 calculates a reference luminance value for referring to the gray scale correction characteristic function for each bin of the block histogram of each spatial block and supplies the reference luminance value to the coefficient calculation unit 244.

The coefficient calculation unit 244 reads the spline control point of each spatial block from the gray scale correction characteristic memory 242 and calculates the gray scale correction characteristic function of each spatial block based on the read spline control point. The coefficient calculation unit 244 calculates the gray scale correction coefficient for each bin of the block histogram of each spatial block based on the gray scale correction characteristic function of each spatial block and the reference luminance value. The coefficient calculation unit 244 stores the gray scale correction coefficient table which is a list of calculated gray scale correction coefficients in the gray scale correction coefficient table memory 204.

[Configuration Example of Function of Gray Scale Correction Characteristic Determination Unit]

Figure 9:
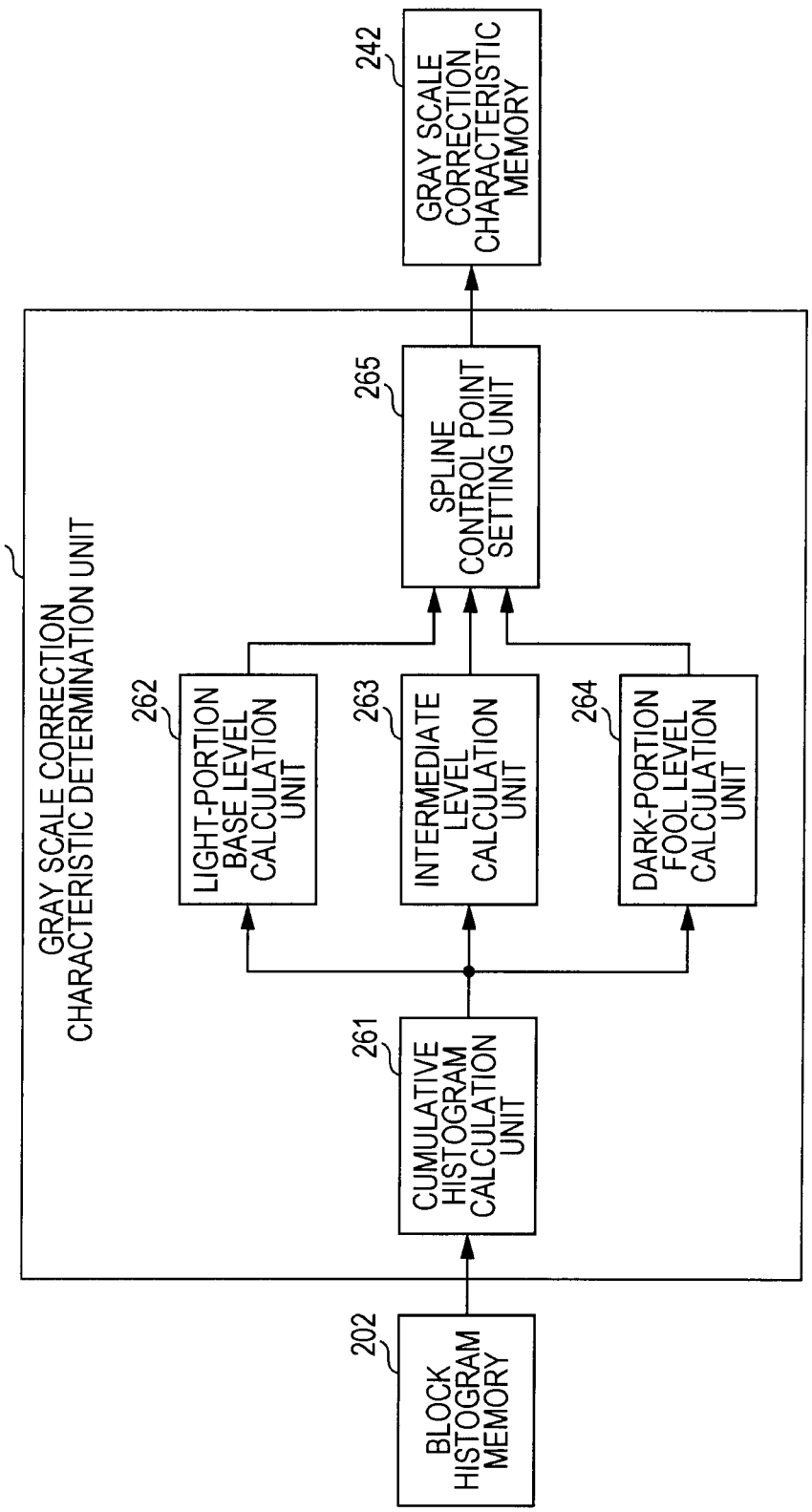
FIG. 9 is a block diagram showing a configuration example of a gray scale correction characteristic determination unit.

FIG. 9 is a block diagram showing a configuration example of the function of the gray scale correction characteristic determination unit 241 of FIG. 8. The gray scale correction characteristic determination unit 241 includes a cumulative histogram calculation unit 261, a light-portion base level calculation unit 262, an intermediate level calculation unit 263, a dark-portion base level calculation unit 264 and a spline control point setting unit 265.

The cumulative histogram calculation unit 261 reads the block histogram of each spatial block from the block histogram memory 202 and calculates a cumulative histogram function of each spatial block. The cumulative histogram calculation unit 261 supplies the calculated cumulative histogram function to the light-portion base level calculation unit 262, the intermediate level calculation unit 263 and the dark-portion base level calculation unit 264.

The light-portion base level calculation unit 262 calculates a light-portion base level which is a luminance value of a base of a light luminance side of the block histogram of each spatial block based on the cumulative histogram function. The light-portion base level calculation unit 262 supplies the calculated light-portion base level to the spline control point setting unit 265.

The intermediate level calculation unit 263 calculates an intermediate level which is a luminance value of a central value of the block histogram of each spatial block based on the cumulative histogram function. The intermediate level calculation unit 263 supplies the calculated intermediate level to the spline control point setting unit 265.

The dark-portion base level calculation unit 264 calculates a dark-portion base level which is a luminance value of a base of a dark luminance side of the block histogram of each spatial block based on the cumulative histogram function.

The dark-portion base level calculation unit 264 supplies the calculated dark-portion base level to the spline control point setting unit 265.

The spline control point setting unit 265 sets a spline control point used to calculate the gray scale correction characteristic function of each spatial block based on the light-portion base level, the intermediate level and the dark-portion base level and stores the spline control point in the gray scale correction characteristic memory 242.

[Configuration Example of Function of Reference Luminance Value Calculation Unit]

Figure 10:
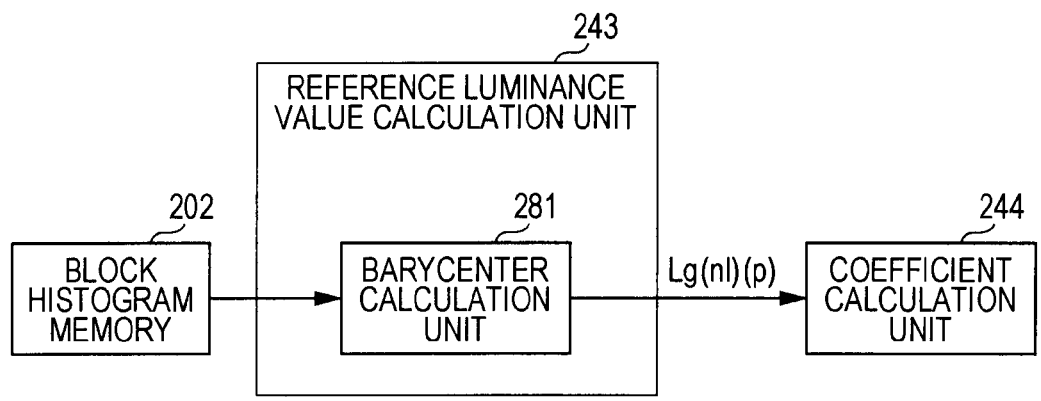
FIG. 10 is a block diagram showing a configuration example of a reference luminance value calculation unit.

FIG. 10 is a block diagram showing a configuration example of the function of the reference luminance value calculation unit 243 of FIG. 8. The reference luminance value calculation unit 243 includes a barycenter calculation unit 281.

The barycenter calculation unit 281 reads the block histogram of each spatial block from the block histogram memory 202. The barycenter calculation unit 281 calculates the barycenter of the luminance value of each bin of the block histogram of each spatial block as a reference luminance value Lg(nl)(p) of each bin and supplies the baryenter to the coefficient calculation unit 244.

[Configuration Example of Function of Gray Scale Correction Application Unit]

Figure 11:
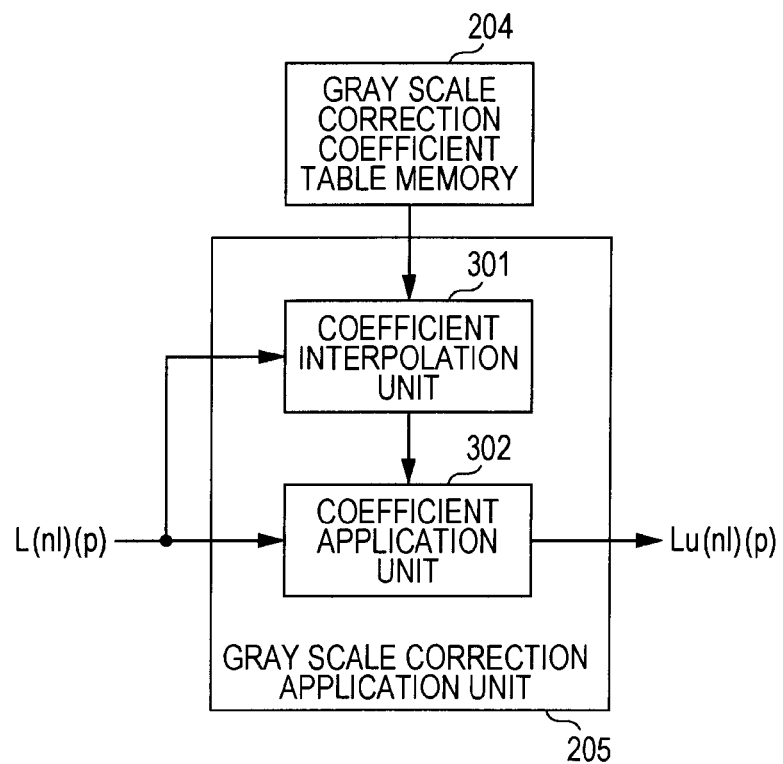
FIG. 11 is a block diagram showing a configuration example of a gray scale correction application unit.

FIG. 11 is a block diagram showing a configuration example of the function of the gray scale correction application unit 205 of FIG. 6. The gray scale correction application unit 205 includes a coefficient interpolation unit 301 and a coefficient application unit 302.

The coefficient interpolation unit 301 reads the gray scale correction coefficient table from the gray scale correction coefficient table memory 204. The coefficient interpolation unit 301 calculates the gray scale correction coefficient of the luminance value L(nl)(p) of the target pixel supplied from the non-linear transform unit 182 and the position p by an interpolation processing and supplies the gray scale correction coefficient to the coefficient application unit 302.

The coefficient application unit 302 applies the gray scale correction coefficient calculated by the coefficient interpolation unit 301 to the luminance value L(nl)(p) supplied from the non-linear transform unit 182 so as to calculate a luminance value Lu(nl)(p), the gray scale of which is corrected. The coefficient application unit 302 supplies the calculated luminance value Lu(nl)(p) to the gray scale correction unit 185.

[Description of Image Processing of DSP Block of Digital Camera]

Next, image processing executed by the DSP 116 will be described with reference to the flowchart of FIG. 12. In addition, this processing begins, for example, by photographing with the digital video camera of FIG. 2 and begins when supply of a stream of image data (mosaic image) from the A/D converter 115 to the DSP 116 begins. The image data supplied to the DSP 116 is sequentially stored in an internal memory (not shown) of the DSP 116.

In step S11, the white balance processing unit 151 reads a mosaic image. Specifically, the white balance processing unit 151 reads the mosaic image of a beginning frame stored in the internal memory (not shown) of the DSP 116.

In step S12, the white balance processing unit 151 adjust white balance of the acquired mosaic image and supplies the adjusted mosaic image to the demosaic processing unit 152.

In step S13, the demosaic processing unit 152 performs demosaic processing. That is, the demosaic processing unit 152 performs demosaic processing with respect to the mosaic image from the white balance processing unit 151 and generates an RGB image.

In step S14, the gray scale correction processing unit 153 performs gray scale correction processing and corrects the gray scale of the RGB image from the demosaic processing unit 152. The gray scale correction processing unit 153 supplies the RGB image, the gray scale of which is corrected, to the gamma correction processing unit 154. The details of the gray scale correction processing will be described below.

In step S15, the gamma correction processing unit 154 performs gamma correction with respect to the RGB image from the gray scale correction processing unit 153 and supplies the RGB image to the YC transform processing unit 155.

In step S16, the YC transform processing unit 155 performs YC transform processing. For example, the YC transform processing unit 155 performs YC matrix processing with respect to the RGB image from the gamma correction processing unit 154 and performs band limit with respect to the chroma component so as to generate the Y image and the C image from the RGB image. In step S17, the YC transform processing unit 155 outputs the Y image and the C image. For example, the YC transform processing unit 155 outputs the Y image and the C image to the LCD driver 118 or the CODEC 120 as necessary.

In step S18, the white balance processing unit 151 determines whether or not a subsequent frame is present. For example, if a mosaic image of a subsequent frame is accumulated in the internal memory (not shown) of the DSP 116, it is determined that the subsequent frame is present.

If it is determined that the subsequent frame is present in step S18, the processing returns to step S11, and the mosaic image of the next frame to be processed is read. In contrast, if it is determined that the subsequent frame is not present in step S18, the image processing is finished.

[Description of Gray Scale Correction Processing]

Next, the gray scale correction processing corresponding to the processing of step S14 of FIG. 12 will be described with reference to the flowchart of FIG. 13.

In step S41, the coefficient interpolation unit 301 (FIG. 11) of the gray scale correction application unit 205 reads the gray scale correction coefficient table from the gray scale correction coefficient table memory 204. In addition, details of the gray scale correction coefficient table will be described below.

In step S42, the gray scale correction processing unit 153 reads the pixel value and the pixel position of the target pixel of the RGB image from the demosaic processing unit 152. That is, the gray scale correction processing unit 153 selects one target pixel from among pixels which are not still processed of the RGB image. The luminance calculation unit 181 of the gray scale correction processing unit 153 and the non-linear transform unit 184-1 to the non-linear transform unit 184-3 read the pixel value Rw(p) of the R component, the pixel value Gw(p) of the G component and the pixel value Bw(p) of the B component of the selected target pixel and the pixel position p thereof from the demosaic processing unit 152.

In step S43, the luminance calculation unit 181 calculates the luminance value L(p) of the target pixel based on the read pixel values and supplies the luminance value to the non-linear transform unit 182. For example, the luminance calculation unit 181 multiplies the read pixel value Rw(p) to pixel value Bw(p) by a predetermined coefficient so as to obtain a linear sum and sets the linear sum to a luminance value or sets a maximum value of the pixel value Rw(p) to pixel value Bw(p) to a luminance value.

In step S44, the non-linear transform unit 182 non-linearly transforms the luminance value L(p) from the luminance calculation unit 181. For example, non-linear transform unit 182 non-linearly transforms the luminance value L(p) using a function having an upwardly convex monotonically increasing characteristic such as a multiplication characteristic or a logarithmic characteristic by an index less than 1. The non-linear transform unit 182 supplies the luminance value L(nl)(p) obtained by transform and the pixel position p to the bin selection unit 221 (FIG. 7) of the block histogram calculation unit 201 and the coefficient interpolation unit 301 and the coefficient application unit 302 (FIG. 11) of the gray scale correction application unit 205.

In step S45, the block histogram calculation unit 201 performs pixel processing for calculating the block histogram. Although the pixel processing for calculating the block histogram will be described below, the number of pixels belonging to each bin of the block histogram of each spatial block is counted by this processing.

In step S46, the luminance gray scale correction unit 183 performs luminance gray scale correction processing. Although details of luminance gray scale correction processing will be described below, the luminance value Lu(nl)(p) in which the gray scale of the luminance value L(nl)(p) of the target pixel is corrected is calculated and supplied to the gray scale correction unit 85 by this processing.

In step S47, the non-linear transform unit 184 non-linearly transforms the pixel values of the target pixel and supplies the pixel values to the gray scale correction unit 185. That is, the non-linear transform unit 184-1 to the non-linear transform unit 184-3 performs the same non-linear transform as the non-linear transform performed in the process of the step S44 with respect to the pixel values Rw(p), Gw(p) and Bw(p) of the RGB image.

In step S48, the gray scale correction unit 185-1 to the gray scale correction unit 185-3 correct the gray scales of the pixel values from the non-linear transform unit 184 using the luminance value L(nl)(p) from the non-linear transform unit 182 and the luminance value Lu(nl)(p) from the luminance gray scale correction unit 183. The gray scale correction unit 185 supplies the pixel values, the gray scales of which are corrected, to the non-linear inverse transform unit 186.

For example, the gray scale correction unit 185 multiplies a ratio of the luminance value L(nl)(p) to the luminance value Lu(nl)(p), the gray scale of which is corrected, by the pixel value of each color component. In greater detail, for example, the gray scale correction unit 185-1 obtains the pixel value Ru(nl)(p), the gray scale of which is corrected, by calculating Equation (1).

Equation 1

$$Ru(nl)(p) = \left(\frac{R(nl)(p)}{L(nl)(p)}\right) \cdot Lu(nl)(p) \quad (1)$$

In Equation (1), the ratio of luminance values before and after gray scale correction, that is, the value obtained by dividing the luminance value Lu(nl)(p), the gray scale of which is corrected, by the luminance value L(nl)(p) before gray scale correction, is multiplied by the non-linearly transformed pixel value R(nl)(p). Even in the gray scale correction unit 185-2 and the gray scale correction unit 185-3, the same calculation as the above-described Equation (1) is performed such that the gray scale of the pixel value is corrected.

In the case where the non-linear transform performed by the non-linear transform unit 182 and the non-linear transform unit 184 is a logarithmic characteristic, the gray scale of the pixel value may be corrected by calculation of Equation (2).

Equation 2

$$Ru(nl)(p) = (R(nl)(p) - L(nl)(p)) + Lu(nl)(p) \quad (2)$$

In Equation (2), a difference value between the luminance value Lu(nl)(p), the gray scale of which is corrected, and the luminance value L(nl)(p) before gray scale correction is added to the pixel value R(nl)(p) so as to obtain the pixel value Ru(nl)(p), the gray scale of which is corrected.

In step S49, the non-linear inverse transform unit 186-1 to the non-linear inverse transform unit 186-3 perform non-linear inverse transform which is the inverse transform of the non-linear transform of the non-linear transform unit 184, with respect to the pixel values from the gray scale correction unit 185.

In step S50, the non-linear inverse transform unit 186-1 to the non-linear inverse transform unit 186-3 outputs the pixel values Ru(p), Gu(p) and Bu(p) obtained by non-linear inverse transform to the gamma correction processing unit 154.

In step S51, the gray scale correction processing unit 153 determines whether or not all pixels of the RGB image of the frame to be processed are processed. In step S51, if it is determined that all pixels are not still processed in step S51, the processing returns to step S42 and the above-described processing is repeated.

In contrast, if it is determined that all pixels are processed in step S51, the processing progresses to step S52.

In step S52, the gray scale correction coefficient calculation unit 203 (FIG. 6) performs gray scale correction coefficient table preparation processing. Although details of gray scale correction coefficient table preparation processing will be described below, the gray scale correction coefficient table is prepared and stored in the gray scale correction coefficient table memory 204 by this processing.

Figure 12:
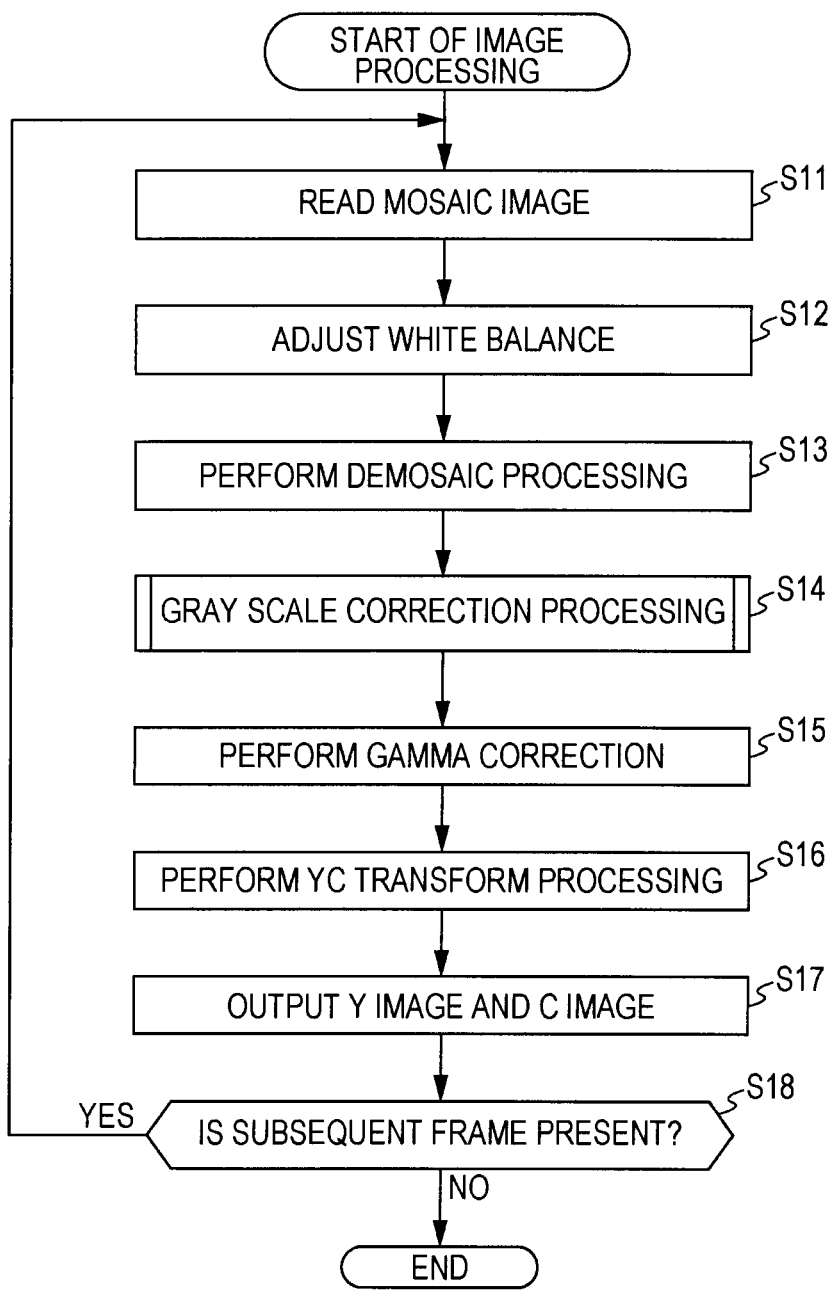
FIG. 12 is a flowchart illustrating image processing.

Thereafter, the gray scale correction processing is finished and the processing progresses to step S15 of FIG. 12.

In the gray scale correction processing, the gray scale correction coefficient table is prepared based on the luminance image corresponding to one frame and is stored in the gray scale correction coefficient table memory 204. The luminance gray scale correction unit 183 performs gray scale correction processing using the gray scale correction coefficient table prepared from a frame in time prior to a frame, which is being currently processed. Accordingly, even when an image to be processed is a moving image, it is possible to perform gray scale correction processing with a large operator size by a low computational complexity and a small amount of working memory, without scanning all pixels of an image two times.

[Description of Pixel Processing for Calculating Block Histogram]

Next, pixel processing for calculating the block histogram, which corresponds to the processing of step S45 of FIG. 13, will be described with reference to the flowchart of FIG. 14.

In step S101, the bin selection unit 221 (FIG. 7) specifies the bin to which the target pixel belongs. Specifically, the bin selection unit 221 specifies the spatial block, to which the target pixel belong, from the position p of the target pixel. In addition, the bin selection unit 221 specifies the bin, to which the target pixel belongs, in the block histogram of the spatial block, to which the target pixel belongs, from the luminance value L(nl)(p) of the target pixel.

In step S102, the bin selection unit 221 increases the value of the counter 222 corresponding to the specified bin by one.

Figure 13:
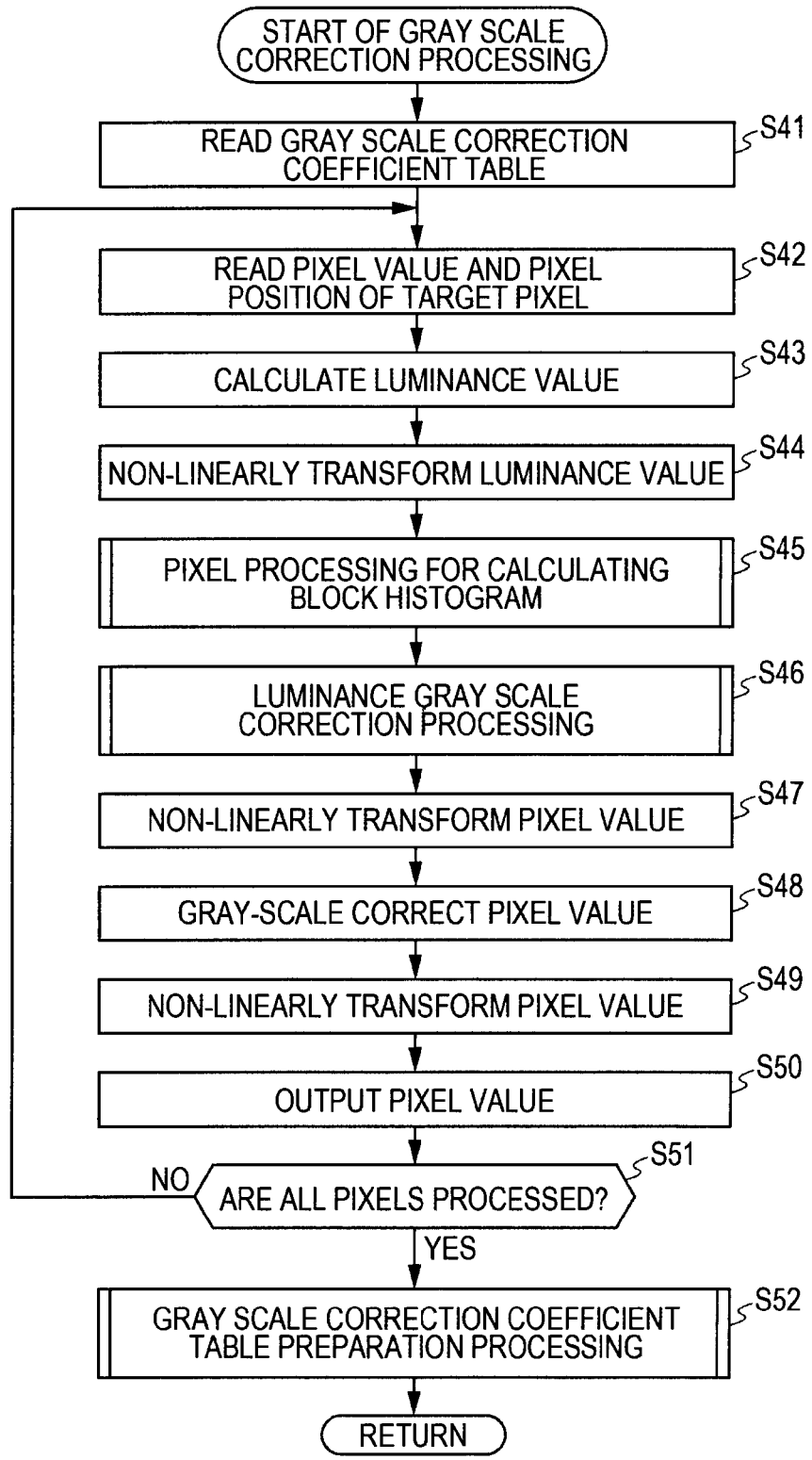
FIG. 13 is a flowchart illustrating gray scale correction processing.
Figure 14:
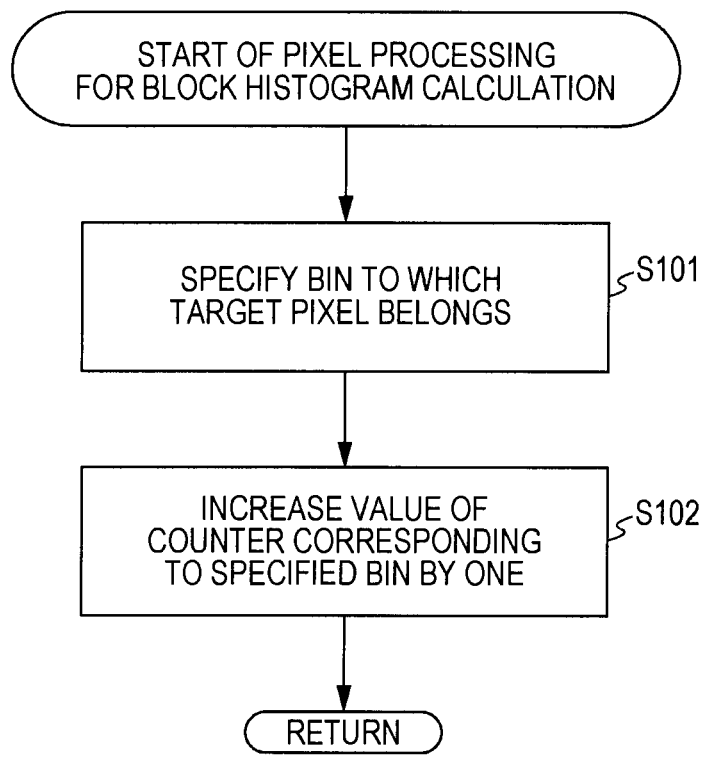
FIG. 14 is a flowchart illustrating image processing for block histogram calculation.

Thereafter, the pixel processing for calculating the block histogram is finished and the processing progresses to step S46 of FIG. 13.

The pixels of the luminance image including the luminance value L(nl)(p) are classified in a spatial direction and a luminance direction and the number of pixels is counted such that the block histogram of each spatial block is generated.

[Description of Luminance Gray Scale Correction Processing]

Figure 15:
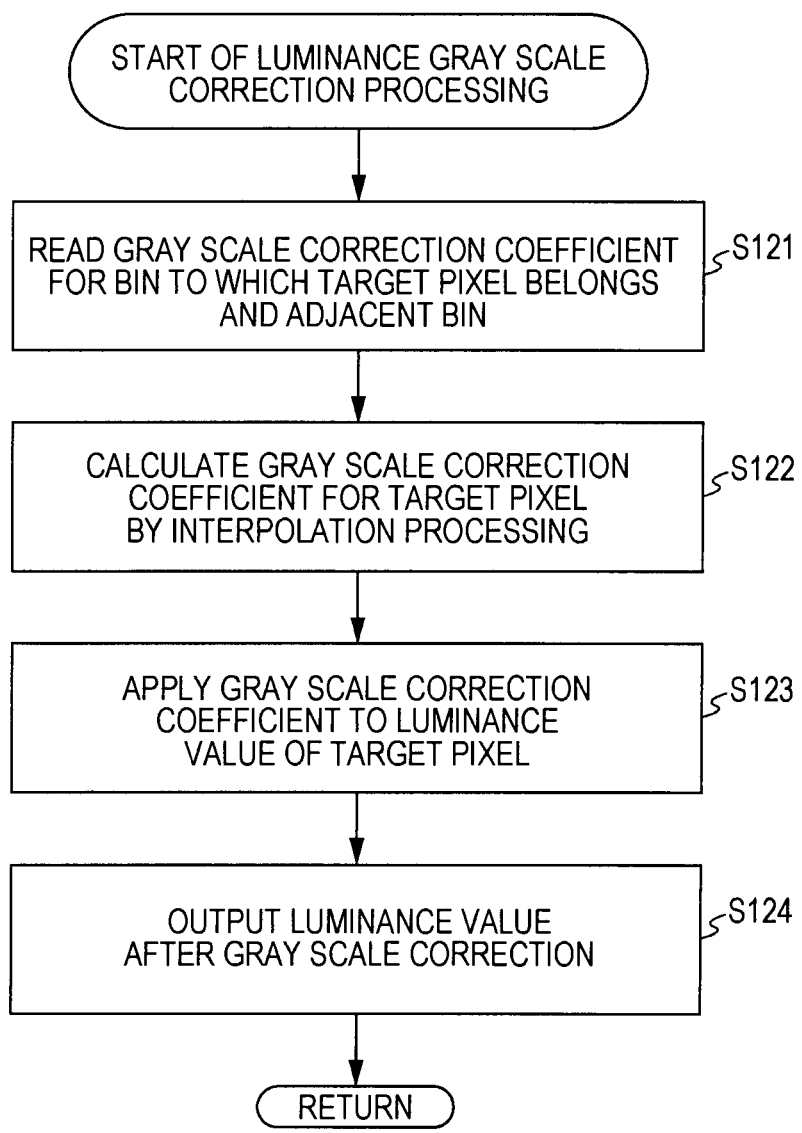
FIG. 15 is a flowchart illustrating luminance gray scale correction processing.

Next, the luminance gray scale correction processing of step S46 of FIG. 13 will be described with reference to the flowchart of FIG. 15.

In step S121, the coefficient interpolation unit 301 (FIG. 11) reads the gray scale correction coefficient of the bin, to which the target pixel belongs, and the adjacent bin. For example, the coefficient interpolation unit 301 selects the bin within a predetermined luminance range from the bin, to which the target pixel belongs, as the adjacent bin, among the bin of the block histogram of the spatial block, to which the target pixel belongs, and the bin of the block histogram of the spatial block within a predetermined range from the spatial block, to which the target pixel belongs. That is, the coefficient interpolation unit 301 selects the bin in which the distance from the bin, to which the target pixel belongs, in both the spatial direction and the luminance direction is within a predetermined range as the adjacent bin. The coefficient interpolation unit 301 reads the gray scale correction coefficient of the bin, to which the target pixel belongs, and the adjacent bin from the gray scale correction coefficient table.

In step S122, the coefficient interpolation unit 301 calculates the gray scale correction coefficient of the target pixel by an interpolation process. That is, the coefficient interpolation unit 301 performs interpolation of the gray scale correction coefficient of the spatial direction and the luminance direction by an appropriate interpolation processing based on the gray scale correction coefficient of the bin, to which the target pixel belongs, and the adjacent bin and performs interpolation of the gray scale correction coefficient of the luminance value L(nl)(p) of the target pixel and the position p. At this time, for example, an interpolation processing used for interpolation of same-interval data, such as linear interpolation or third spline interpolation is performed. The coefficient interpolation unit 301 supplies the calculated gray scale correction coefficient to the coefficient application unit 302.

In step S123, the coefficient application unit 302 applies the gray scale correction coefficient calculated by the coefficient interpolation unit 301 to the luminance value L(nl)(p) of the target pixel. For example, the coefficient application unit 302 multiplies the luminance value L(nl)(p) of the target pixel by the gray scale correction coefficient calculated the coefficient interpolation unit 301 so as to calculate the luminance value Lu(nl)(p), the gray scale of which is corrected. Alternatively, if the non-linear transform performed by the non-linear transform unit 182 is a logarithmic characteristic, the coefficient application unit 302 adds the gray scale correction coefficient calculated by the coefficient interpolation unit 301 to the luminance value L(nl)(p) of the target pixel so as to calculate the luminance value Lu(nl)(p), the gray scale of which is corrected.

In step S124, the coefficient application unit 302 outputs the luminance value Lu(nl)(p) after gray scale correction to the gray scale correction unit 185 of FIG. 5.

Thereafter, the luminance gray scale correction processing is finished and the processing progresses to step S47 of FIG. 13.

[Description of Gray Scale Correction Coefficient Table Preparation Processing]

Next, the gray scale correction coefficient table preparation processing of step S52 of FIG. 13 will be described with reference to the flowchart of FIG. 16.

In step S141, the gray scale correction coefficient calculation unit 203 (FIG. 8) selects a target spatial block. That is, the gray scale correction coefficient calculation unit 203 selects one of spatial blocks, in which the gray scale correction coefficient is not still calculated, as the target spatial block.

Figure 17:
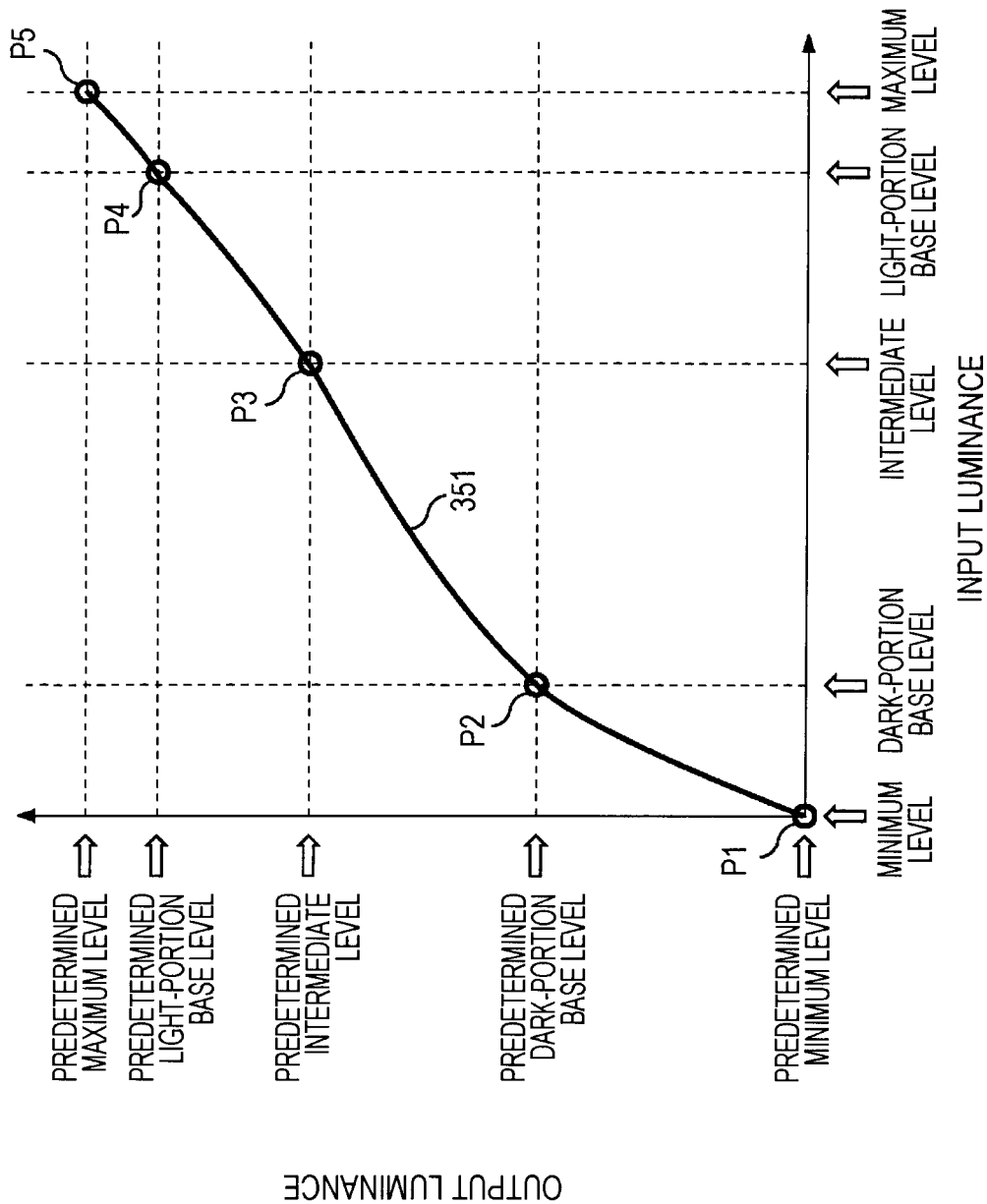
FIG. 17 is a graph showing an example of a gray scale correction characteristic function.

In step S142, the gray scale correction characteristic determination unit 241 performs the gray scale correction characteristic determination processing. In addition, although details of the gray scale correction characteristic determination processing will be described below, for example, spline control points P1 to P5 of the gray scale correction characteristic function 351 shown in FIG. 17 are set by this processing. The horizontal axis of FIG. 17 denotes an input luminance and the vertical axis thereof denotes an output luminance.

In step S143, the reference luminance value calculation unit 243 selects a target bin. That is, the reference luminance value calculation unit 243 selects one of the bins, in which the gray scale correction coefficient is not calculated, among the bins of the block histogram of the target spatial block, as the target bin.

In step S144, the reference luminance value calculation unit 243 performs reference luminance value calculation processing. In addition, although details of the reference luminance value calculation processing will be described below, through this processing, the reference luminance value Lg(nl)(p) used to refer to the gray scale correction characteristic function is calculated and is supplied to the coefficient calculation unit 244, in order to calculate the gray scale correction coefficient of the target bin.

In step S145, the coefficient calculation unit 244 calculates the reference result of the gray scale correction characteristic function. Specifically, the coefficient calculation unit 244 reads the spline control point P1 to P5 (FIG. 17) of the gray scale correction characteristic function of the target bin from the gray scale correction characteristic memory 242. The coefficient calculation unit 244 calculates the gray scale correction characteristic function passing through the spline control points P1 to P5, for example, by a predetermined interpolation processing such as third spline interpolation. The coefficient calculation unit 244 calculates an output luminance value when the reference luminance value Lg(nl)(p) calculated by the reference luminance value calculation unit 243 is applied to the gray scale correction characteristic function as an input luminance value as the reference result of the gray scale correction characteristic function.

In step S146, the coefficient calculation unit 244 calculates the gray scale correction coefficient. For example, the coefficient calculation unit 244 calculates a ratio (reference result reference luminance value Lg(nl)(p)) of the reference result to the reference luminance value Lg(nl)(p) of the gray scale correction characteristic function to the reference as the gray scale correction coefficient of the target bin. Alternatively, if the non-linear transform performed by the non-linear transform unit 182 is a logarithmic characteristic, the coefficient calculation unit 244 calculates the difference between the reference result and the reference luminance value Lg(nl)(p) of the gray scale correction characteristic function as the gray scale correction coefficient of the target bin.

In step S147, the coefficient calculation unit 244 stores the gray scale correction coefficient in the memory. That is, the coefficient calculation unit 244 stores the calculated gray scale correction coefficient in the gray scale correction coefficient table memory 204 in association with the position of the spatial direction and the luminance direction of the target bin.

In step S148, the reference luminance value calculation unit 243 determines whether or not all bins of the block histogram of the target spatial block have been processed. The reference luminance value calculation unit 243 determines that all bins of the block histogram of the target spatial block are not still processed if the bin in which the gray scale correction coefficient is not still calculated is remained and the processing returns to step S143.

Thereafter, in step S148, the processing of steps S143 to S148 is repeatedly executed until it is determined that all bins of the block histogram of the target spatial block have been processed. The gray scale correction coefficient of each bin of the block histogram of the target spatial block is calculated and stored in the gray scale correction coefficient table memory 204.

In contrast, in step S148, if it is determined that all bins of the block histogram of the target spatial block have been processed, the processing progresses to step S149.

In step S149, the gray scale correction coefficient calculation unit 203 determines whether or not all spatial blocks have been processed. The gray scale correction coefficient calculation unit 203 determines that all spatial blocks are not still processed if the spatial block in which the gray scale correction coefficient is not still calculated is remained and the processing returns to step S141.

Thereafter, in step S149, the processing of steps S141 to S149 is repeatedly executed until it is determined that all spatial blocks have been processed. The gray scale correction coefficient of each bin of the block histogram of each spatial block is calculated and the gray scale correction coefficient table in which each bin of each block histogram is associated with the gray scale correction coefficient is stored in the gray scale correction coefficient table memory 204.

In contrast, if it is determined that all spatial blocks have been processed in step S149, the gray scale correction coefficient table preparation processing is finished and the processing progresses to step S15 of FIG. 12.

[Description of Gray Scale Correction Characteristic Determination Processing]

Next, the gray scale correction characteristic determination processing of step S142 of FIG. 16 will be described with reference to the flowchart of FIG. 18.

In step S161, the cumulative histogram calculation unit 261 (FIG. 9) calculates the cumulative histogram function of the target spatial block. Specifically, the cumulative histogram calculation unit 261 reads the block histogram of the target spatial block from the block histogram memory 202. The cumulative histogram calculation unit 261 sequentially adds the frequency count of each bin of the read block histogram from a side in which the luminance is small so as to calculate the cumulative histogram function. The cumulative histogram calculation unit 261 supplies the calculated cumulative histogram function to the light-portion base level calculation unit 262, the intermediate level calculation unit 263 and the dark-portion base level calculation unit 264.

Figure 19:
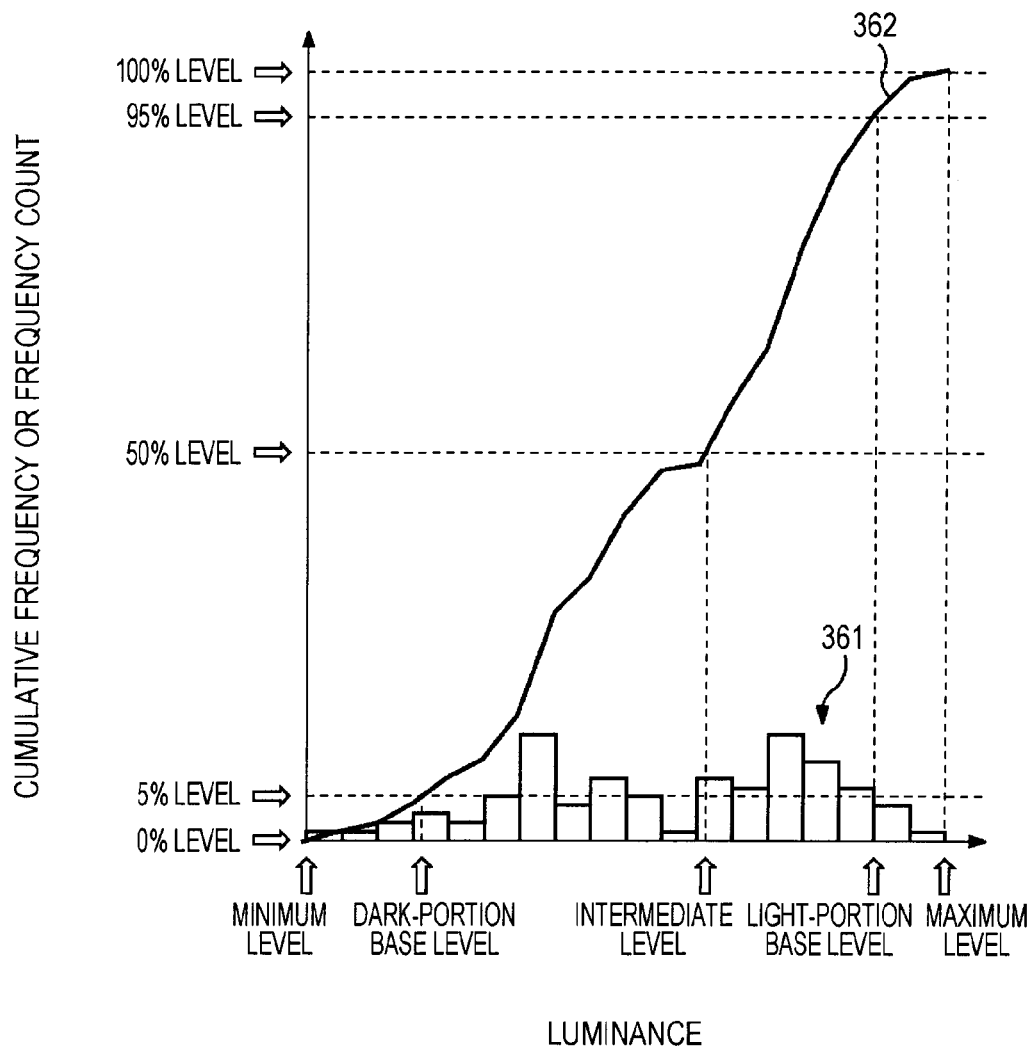
FIG. 19 is a graph showing an example of a block histogram and a cumulative histogram function.

FIG. 19 shows a detailed example of the cumulative histogram function. The horizontal axis of FIG. 19 shows a luminance and the vertical axis denotes a frequency count or a cumulative frequency. A cumulative histogram function 362 of the block histogram 361 shown by a plurality of histograms is shown.

First, a point in which the value of the luminance direction is equal to a minimum value (hereinafter, referred to as a minimum level) of the luminance value of the luminance image and the value of the cumulative frequency direction becomes 0 becomes a start point of the cumulative histogram function 362. For each bin, a point in which the value of the luminance direction becomes a maximum value of the luminance range of each bin and the value of the cumulative frequency direction becomes the cumulative value (cumulative frequency) of the frequency count from the bin having a minimum luminance range to the corresponding bin is set. Accordingly, a point in which the value of the luminance direction is equal to a maximum value (hereinafter, referred to as a maximum level) of the luminance value of the luminance image and the value of the cumulative frequency direction becomes equal to the number of pixels within the spatial block (100% level) becomes an end point of the cumulative histogram function 362. By connecting the start point and the point set sequentially for each bin, the cumulative histogram function 362 is generated.

In step S162, the light-portion base level calculation unit 262, the intermediate level calculation unit 263 and the dark-portion base level calculation unit 264 calculate the light-portion base level, the intermediate level and the dark-portion base level, respectively. Specifically, the light-portion base level calculation unit 262 calculates, for example, a luminance value in which the cumulative frequency of the cumulative histogram function becomes 95% of the number of pixels within the spatial block and supplies the calculated luminance value to the spline control point setting unit 265 as the light-portion base level. In addition, the intermediate level calculation unit 263 calculates, for example, a luminance value in which the cumulative frequency of the cumulative histogram function becomes 50% of the number of pixels within the spatial block and supplies the calculated luminance value to the spline control point setting unit 265 as the intermediate level. In addition, the dark-portion base level calculation unit 264 calculates, for example, a luminance value in which the cumulative frequency of the cumulative histogram function becomes 5% of the number of pixels within the spatial block and supplies the calculated luminance value to the spline control point setting unit 265 as the dark-portion base level.

In step S163, the spline control point setting unit 265 sets the spline control points of the gray scale correction characteristic function. Now, the example of the method of setting the spline control point will be described with reference to FIG. 17.

As described above, in FIG. 17, five spline control points P1 to P5 are set. The spline control point P1 is a point in which the value of the input luminance direction becomes the minimum value (minimum level) of the luminance value of the luminance image and the value of output luminance direction becomes the minimum value (hereinafter, referred to as the predetermined minimum level) of the luminance value of the luminance image after gray scale transform. The spline control point P2 is a point in which the value of the input luminance direction becomes a dark-portion base level calculated by the dark-portion base level calculation unit 264 and the value of output luminance direction becomes a predetermined dark-portion base level. The spline control point P3 is a point in which the value of the input luminance direction becomes an intermediate level calculated by the intermediate level calculation unit 263 and the value of output luminance direction becomes a predetermined intermediate level. The spline control point P4 is a point in which the value of the input luminance direction becomes a light-portion base level calculated by the light-portion base level calculation unit 262 and the value of output luminance direction becomes a predetermined light-portion base level. The spline control point P5 is a point in which the value of the input luminance direction becomes a maximum value (maximum level) of the luminance value of the luminance image and the value of output luminance direction becomes a maximum value (hereinafter, referred to as a predetermined maximum level) of the luminance value of the luminance image after gray scale transform.

In addition, the predetermined minimum level, the predetermined dark-portion base level, the predetermined intermediate level, the predetermined light-portion base level, the predetermined maximum level are values which are set in advance from the view point of which of the five luminance levels, that is, the minimum level, the dark-portion base level, the intermediate level, the light-portion base level and the maximum level, is allocated after gray scale correction to the luminance level.

In step S164, the spline control point setting unit 265 stores the spline control points in the memory. That is, the spline control point setting unit 265 stores the coordinates of the set spline control points P1 to P5 of the target spatial block in the gray scale correction characteristic memory 242.

Figure 16:
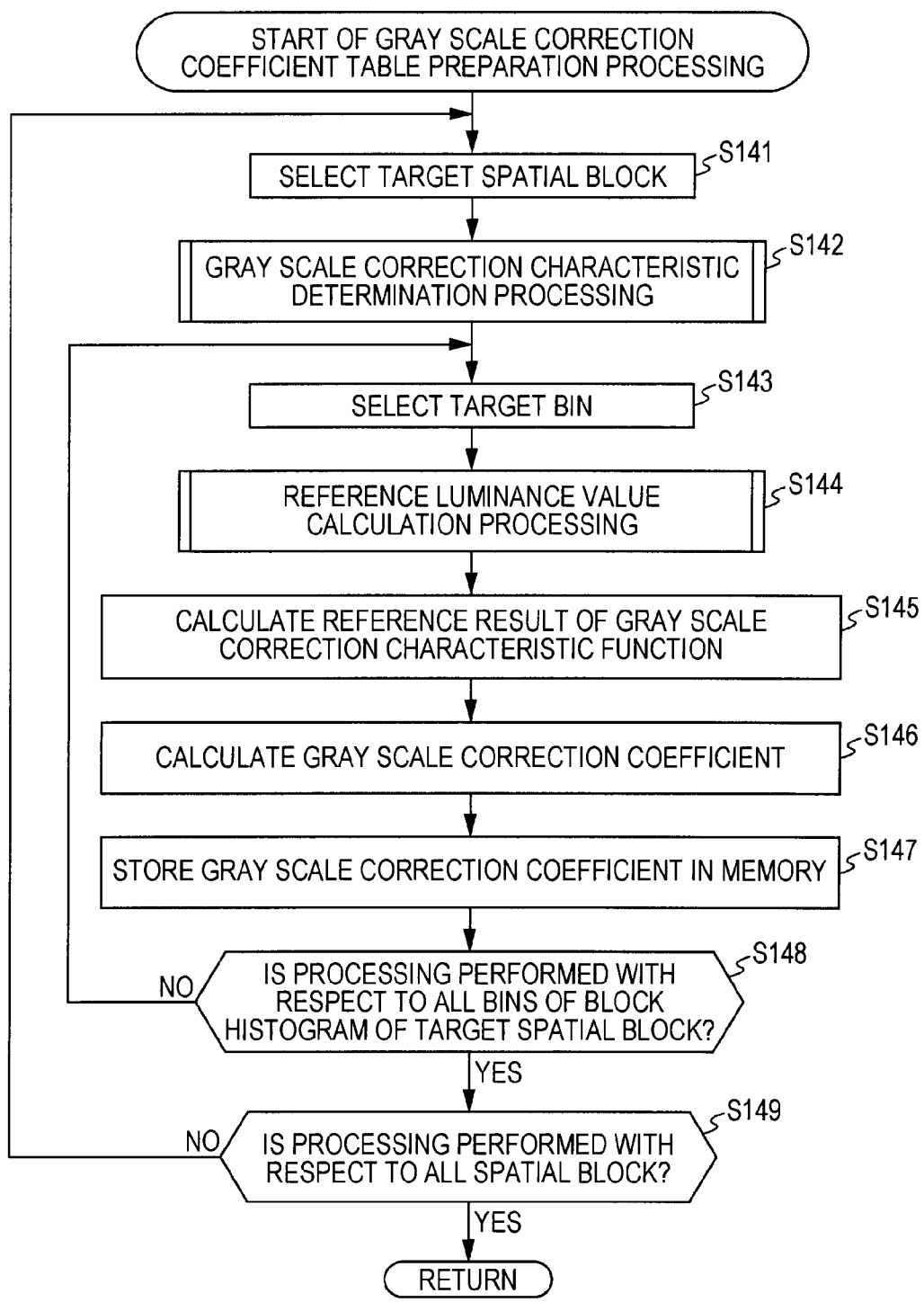
FIG. 16 is a flowchart illustrating gray scale correction coefficient table preparation processing.

Thereafter, the gray scale correction characteristic determination processing is finished and the processing progresses to step S143 of FIG. 16.

[Description of Reference Luminance Value Calculation Processing]

Figure 20:
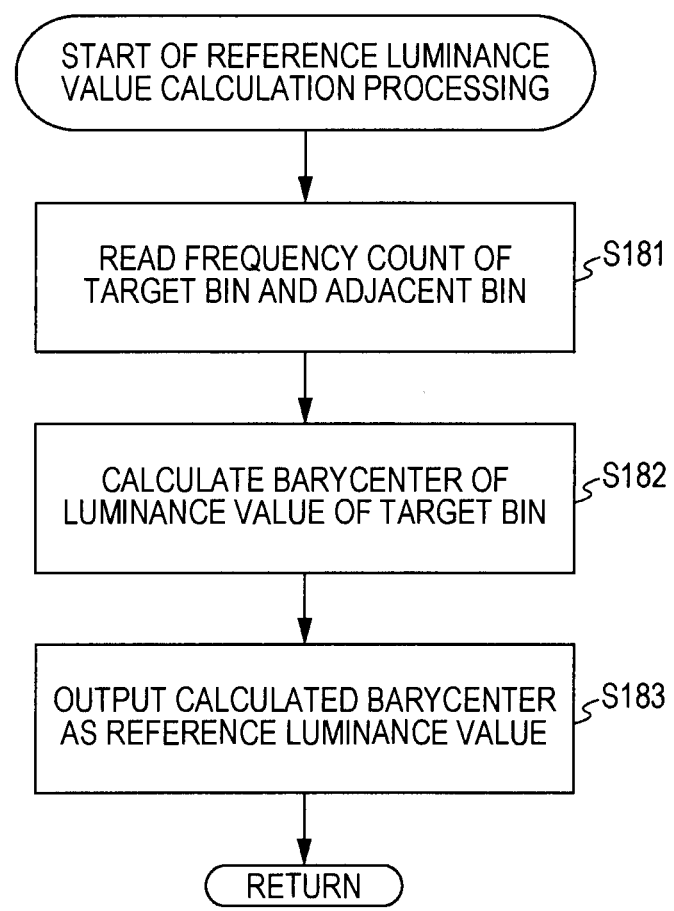
FIG. 20 is a flowchart illustrating reference luminance value calculation processing.

Next, details of the reference luminance value calculation processing of step S144 of FIG. 16 will be described with reference to the flowchart of FIG. 20.

In step S181, the barycenter calculation unit 281 (FIG. 10) reads the frequency count of the target bin and the adjacent bin. Specifically, the barycenter calculation unit 281 selects the bin other than the target bin and each bin of the block histogram of the spatial block within the predetermined range from the target spatial block from among the bins of the block histogram of the target spatial block, as the adjacent bin (hereinafter, referred to as the adjacent bin) of the target bin. That is, the coefficient interpolation unit 301 selects each bin (excluding the target bin) of the block histogram of the target spatial block and the adjacent spatial block as the adjacent bin.

In addition, the coefficient interpolation unit 301 reads the frequency count of the target bin and the adjacent bit from the block histogram memory 102.

In step S182, the barycenter calculation unit 281 calculates the barycenter of the luminance value of the target bin. Specifically, the barycenter calculation unit 281 calculates the weighted average of the luminance values of the pixels belonging to the target bin and the adjacent bin based on the representative value of the luminance values of the target bin and the adjacent bin and the frequency count of the target bin and the adjacent bin as the barycenter of the luminance value of the target bin.

In addition, as the representative value of the luminance values of the target bin and the adjacent bin, for example, the central value of the luminance range of each bin is used. In addition, the weight used to calculate the weighted average may be set to be larger in a bin close in distance to the target bin in the spatial direction and a bin close in distance to the target bin in the luminance direction.

In step S183, the barycenter calculation unit 281 outputs the calculated barycenter to the coefficient calculation unit 244 as the reference luminance value Lg(nl)(p) of the target bin.

Thereafter, the reference luminance value calculation processing is finished and the processing progresses to step S145 of FIG. 16.

Effects of First Embodiment

Since the reference luminance value Lg(nl)(p) of the target bin is set to the barycenter of the luminance value of the target bin, the reference luminance value Lg(nl)(p) becomes a value obtained by correcting the representative value of the luminance value of the target bin in a direction in which the frequency count of the block histogram of the target spatial block is increased when viewed from the target bin. Accordingly, the reference luminance value Lg(nl)(p) of each bin of the block histogram becomes closer to the luminance level corresponding to the hill of the block histogram as compared with the representative value of the luminance value of each bin. As a result, the reference luminance value Lg(nl)(p) has the same characteristic as the general luminance value Ll(nl)(p) of Japanese Unexamined Patent Application Publication No. 2009-177558. Accordingly, since the computation for determining the gray scale correction coefficient based on the reference luminance value Lg(nl)(p) and the gray scale correction characteristic function corresponds to computation in which a tone curve is applied to the general luminance value of Japanese Unexamined Patent Application Publication No. 2009-177558, it is possible to obtain the same gray scale compression effect as Japanese Unexamined Patent Application Publication No. 2009-177558. That is, it is possible to compress the luminance difference of the other component without changing a detail component representative of texture.

In the first embodiment of the present invention, only by calculating the gray scale correction coefficient for each bin of each block histogram, obtaining the gray scale correction coefficient of each pixel from the gray scale correction coefficient for each bin by an interpolation operation and applying the gray scale correction coefficient to each pixel, it is possible to perform gray scale correction of the luminance value of each pixel. Accordingly, the general luminance value and tone curve calculation processing of each pixel which is necessary for the gray scale correction processing of Japanese Unexamined Patent Application Publication No. 2009-177558 is not necessary. In the gray scale correction processing of Japanese Unexamined Patent Application Publication No. 2009-177558, two interpolation operations and one division operation are necessary for calculating the general luminance value. In contrast, in the first embodiment of the present invention, only one interpolation operation is necessary when the gray scale correction coefficient of each pixel is obtained. Accordingly, according to the first embodiment of the present invention, it is possible to reduce the computational complexity as compared with the gray scale correction processing of Japanese Unexamined Patent Application Publication No. 2009-177558 and, as a result, to reduce the scale of the circuit or software for performing the gray scale correction processing.

In addition, in the first embodiment of the present invention, in order to calculate the luminance value Lu(nl)(p) of each pixel, the block histogram and the spline control point may be hold for each spatial block and the reference luminance value Lg(nl)(p) and the gray scale correction coefficient are held for each bin of each block histogram. In contrast, in the gray scale correction processing of Japanese Unexamined Patent Application Publication No. 2009-177558, in order to calculate the luminance value Lu(nl)(p) of each pixel, the block histogram and the block integration value are held for each spatial block and the tone curve are held for each pixel. Accordingly, according to the first embodiment of the present invention, it is possible to reduce the necessary amount of memory as compared with the gray scale correction processing of Japanese Unexamined Patent Application Publication No. 2009-177558.

In the first embodiment of the present invention, in order to calculate the luminance value Lu(nl)(p) of each pixel, in step S41, the gray scale correction coefficient table may be only read. In contrast, in the gray scale correction processing of Japanese Unexamined Patent Application Publication No. 2009-177558, in order to calculate the general luminance value Ll(nl)(p) of each pixel, the block histogram and the block integration value of the block corresponding to the corresponding pixel and the adjacent block thereof are simultaneously read. Accordingly, according to the first embodiment of the present invention, it is possible to reduce the number of access times to the memory and to shorten processing time, as compared with the gray scale correction processing of Japanese Unexamined Patent Application Publication No. 2009-177558.

2. Second Embodiment

Overview of Second Embodiment

Next, a second embodiment of the present invention will be described with reference to FIGS. 21 to 24.

In the second embodiment of the present invention, the computational complexity may be reduced by changing the method of calculating the reference luminance value Lg(nl)(p).

[Configuration Example of Reference Luminance Value Calculation Unit]

Figure 21:
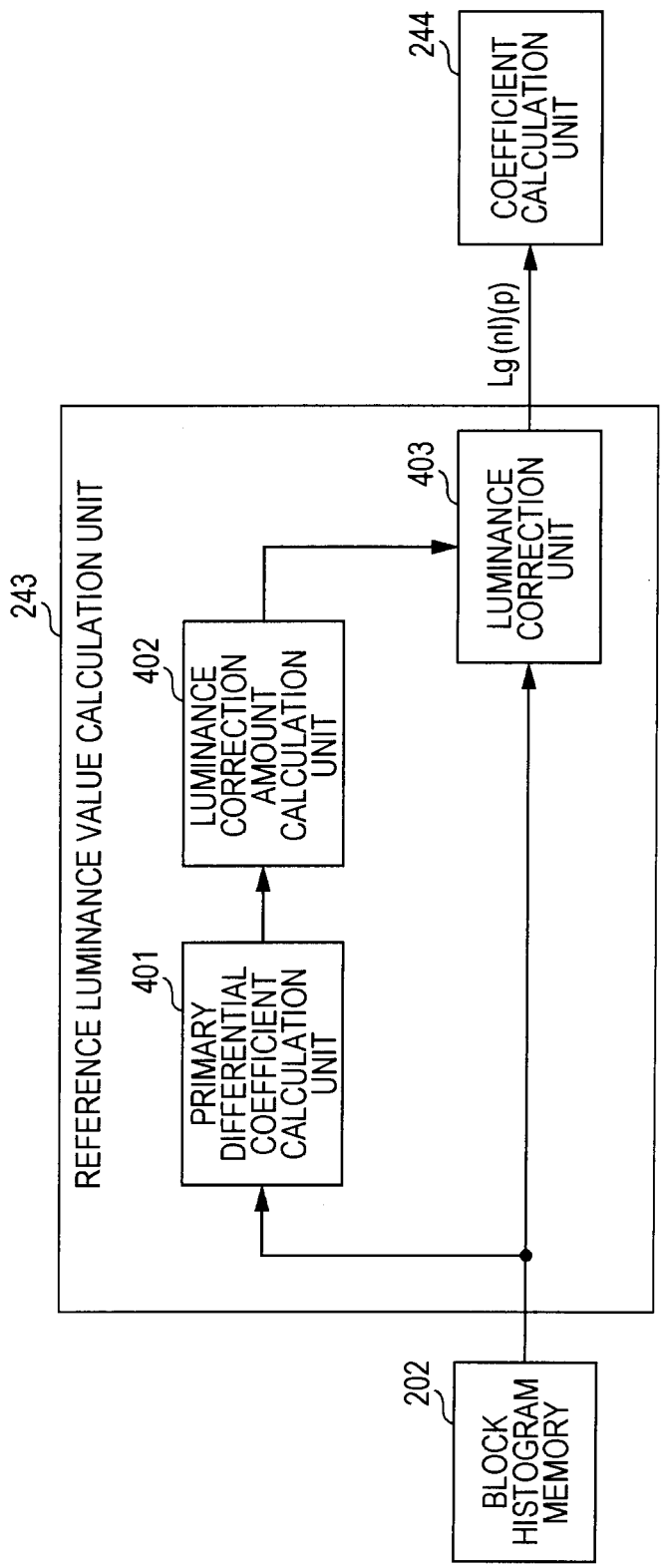
FIG. 21 is a block diagram showing a second configuration example of a reference luminance value calculation unit.

In the digital video camera of the second embodiment of the present invention, instead of the reference luminance value calculation unit 243 of FIG. 10, a reference luminance value calculation unit 243 of FIG. 21 is provided. In FIG. 21, the parts corresponding to FIG. 10 are denoted by the same reference numerals and the description thereof will be appropriately omitted.

The reference luminance value calculation unit 243 of FIG. 21 includes a primary differential coefficient calculation unit 401, a luminance correction amount calculation unit 402, and a luminance correction unit 403.

The primary differential coefficient calculation unit 401 reads the block histogram of each spatial block from the block histogram memory 202, and calculates and supplies a primary differential coefficient function of each block histogram to the luminance correction amount calculation unit 402.

The luminance correction amount calculation unit 402 calculates a luminance correction amount function for each spatial block based on the primary differential coefficient function of each block histogram and supplies the luminance correction amount function to the luminance correction unit 403.

The luminance correction unit 403 reads the block histogram of each spatial block from the block histogram memory 202. The luminance correction unit 403 corrects the representative value of the luminance value of each bin of each block histogram based on the luminance correction amount function and calculates and supplies the reference luminance value Lg(nl)(p) of each bin to the coefficient calculation unit 244.

[Description of Reference Luminance Value Calculation Processing]

Figure 22:
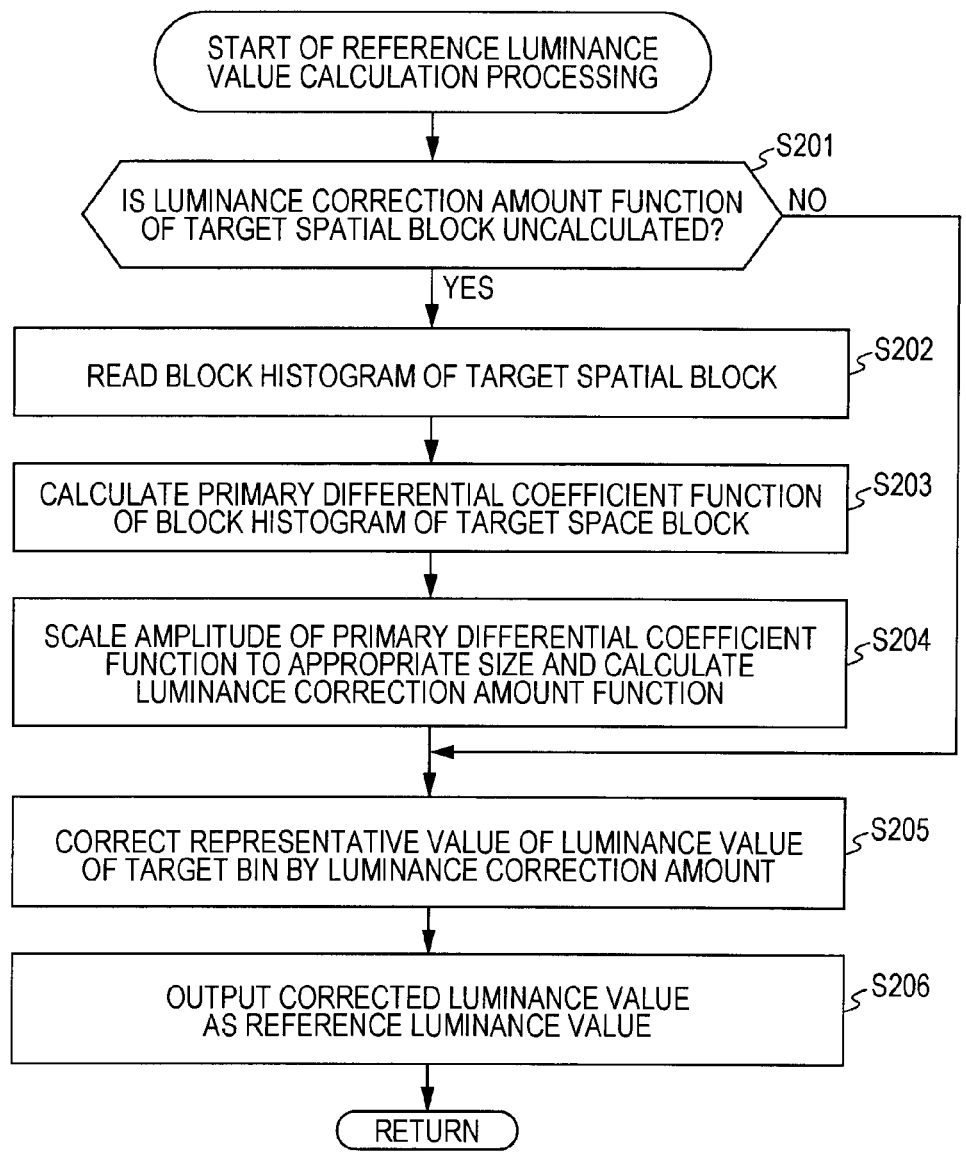
FIG. 22 is a flowchart illustrating reference luminance value calculation processing.

Next, the reference luminance value calculation processing of the case where the reference luminance value calculation unit 243 has the configuration shown in FIG. 21 will be described with reference to the flowchart of FIG. 22. In addition, the reference luminance value calculation processing corresponds to the processing of step S144 of FIG. 16.

In step S201, the primary differential coefficient calculation unit 401 determines whether or not the luminance correction amount function of the target spatial block is uncalculated. If it is determined that the luminance correction amount function of the target spatial block is uncalculated, the processing progresses to step S202.

In step S202, the primary differential coefficient calculation unit 401 reads the block histogram of the target spatial block from the block histogram memory 202.

In step S203, the primary differential coefficient calculation unit 401 calculates the primary differential coefficient function of the block histogram of the target spatial block. For example, the primary differential coefficient calculation unit 401 performs a primary differential operation with respect to the block histogram of the target spatial block, which is discrete data, using a discrete differential operator such as a Sobel operator ([−1 0 1]) so as to calculate the primary differential coefficient function. The primary differential coefficient calculation unit 401 supplies the calculated primary differential coefficient function to the luminance correction amount calculation unit 402.

Figure 23:
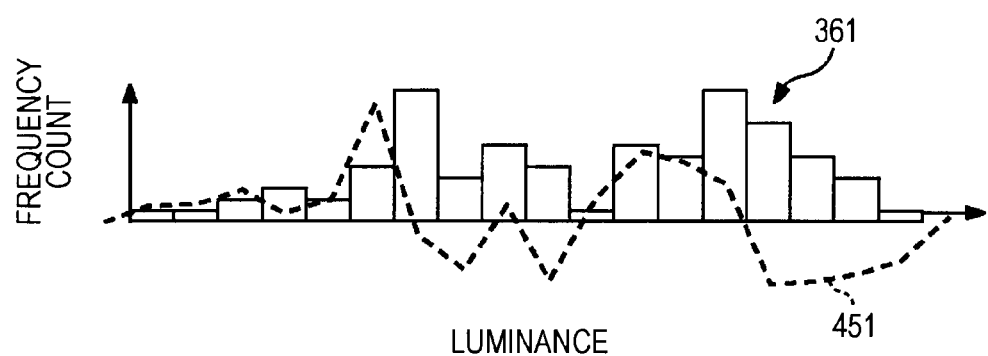
FIG. 23 is a graph showing an example of a primary differential coefficient function.

FIG. 23 shows an example of the primary differential coefficient function 451 calculated by performing a primary differential operation with respect to the block histogram 361 shown in FIG. 19. In addition, the horizontal axis of FIG. 23 denotes a luminance and the vertical axis thereof denotes a frequency count.

Figure 24:
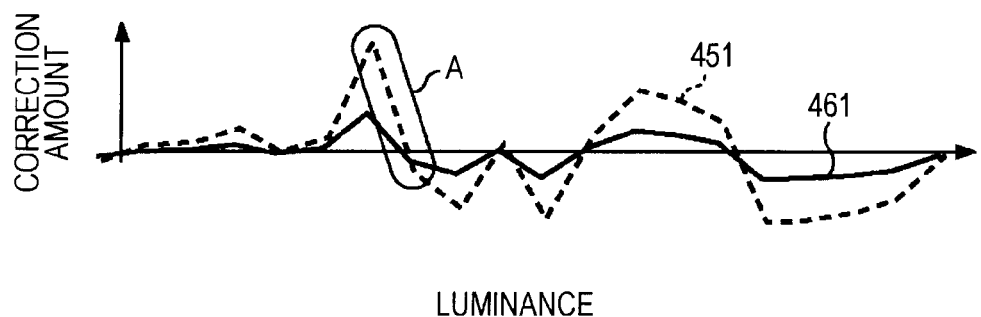
FIG. 24 is a graph showing an example of a luminance correction amount function.

In step S204, the luminance correction amount calculation unit 402 scales the amplitude of the frequency count direction of the primary differential coefficient function to an appropriate size and calculates the luminance correction amount function. For example, the luminance correction amount calculation unit 402 detects a position where the slope of the primary differential coefficient function 451 becomes a minimum (a downward-sloping gradient becomes a maximum). The luminance correction amount calculation unit 402 scales (normalization) the amplitude of the primary differential coefficient function such that the slope of the detected position becomes −1, thereby calculating the luminance correction amount function. For example, as shown in FIG. 24, the amplitude of the primary differential coefficient function 451 such that the slope of the position A in which the slope of the primary differential coefficient function 451 becomes a minimum becomes −1 is scaled, thereby calculating the luminance correction amount function 461. The luminance correction amount calculation unit 402 supplies the calculated luminance correction amount function to the luminance correction unit 403. Thereafter, the processing progresses to step S205.

In step S201, if it is determined that the luminance correction amount function of the target spatial block is calculated, the processing of steps S202 to S204 is skipped and the processing progresses to step S205.

In step S205, the luminance correction unit 403 corrects the representative value of the luminance value of the target bin by the luminance correction amount. For example, the luminance correction unit 403 sets the central value of the luminance range of the target bin to the representative value of the luminance value of the target bin and obtains the value of the luminance correction amount function for the representative value as the luminance correction amount. The luminance correction unit 403 adds the luminance correction amount to the representative value of the luminance value of the target bin so as to correct the representative value of the luminance value of the target bin.

In step S206, the luminance correction unit 403 outputs the corrected luminance value to the coefficient calculation unit 244 as the reference luminance value Lg(nl)(p) of the target bin.

Thereafter, the reference luminance value calculation processing is finished and the processing progresses to step S145 of FIG. 16.

In the second embodiment of the present invention, the processing other than the above-described reference luminance value calculation processing is equal to that of the first embodiment and the description thereof is repeated and thus will be omitted.

Effects of Second Embodiment

In the second embodiment of the present invention, similarly to the first embodiment, the reference luminance value Lg(nl)(p) of the target bin becomes a value obtained by correcting the representative value of the luminance value of the target bin in a direction in which the frequency count of the block histogram of the target spatial block is increased when viewed from the target bin. By appropriately adjusting the size of the luminance correction amount by the processing of step S204, it is possible to prevent excessive correction for exceeding the luminance level corresponding to the hill of the block histogram.

In addition, in the first embodiment of the present invention, it is necessary to perform one division operation for each bin of each block histogram, in order to calculate weighted average of the luminance value, in the calculation of the reference luminance value Lg(nl)(p). In contrast, in the second embodiment of the present invention, in the calculation of the reference luminance value Lg(nl)(p), in order to scale the primary differential coefficient function, only one division operation may be performed for each spatial block. Accordingly, according to the second embodiment of the present invention, it is possible to reduce the computational complexity as compared with the first embodiment.

3. Third Embodiment

Overview of Third Embodiment

Next, a third embodiment of the present invention will be described with reference to FIGS. 25 to 29.

In the third embodiment of the present invention, the computational complexity may be reduced by changing the method of calculating the reference luminance value Lg(nl)(p).

[Configuration Example of Reference Luminance Value Calculation Unit]

Figure 25:
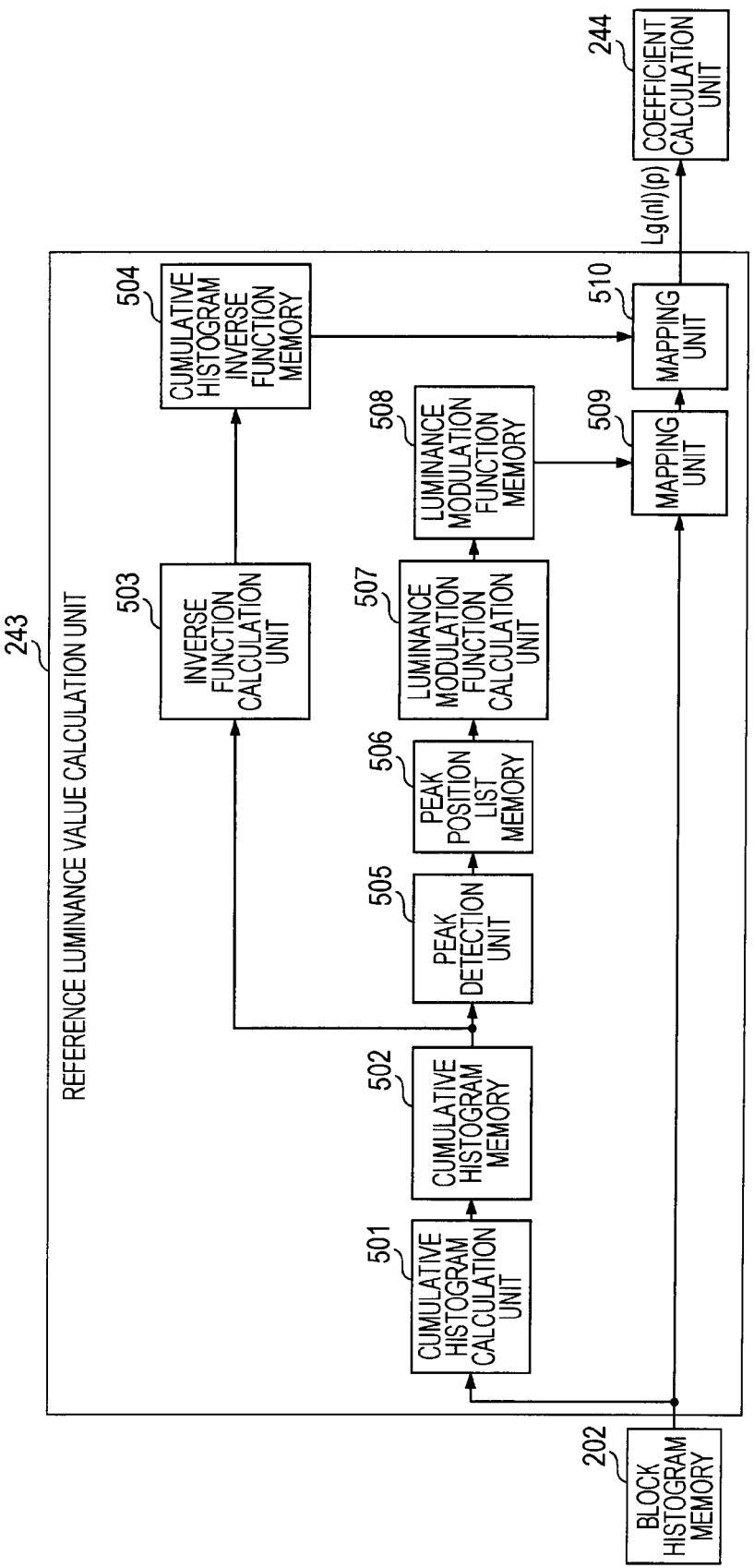
FIG. 25 is a block diagram showing a third configuration example of a reference luminance value calculation unit.

In the digital video camera of the third embodiment of the present invention, instead of the reference luminance value calculation unit 243 of FIG. 10, a reference luminance value calculation unit 243 of FIG. 25 is provided. In FIG. 25, the parts corresponding to FIG. 10 are denoted by the same reference numerals and the description thereof will be appropriately omitted.

The reference luminance value calculation unit 243 of FIG. 25 includes a cumulative histogram calculation unit 501, a cumulative histogram memory 502, an inverse function calculation unit 503, a cumulative histogram inverse function memory 504, a peak detection unit 505, a peak position list memory 506, a luminance modulation function calculation unit 507, a luminance modulation function memory 508, a mapping unit 509 and a mapping unit 510.

The cumulative histogram calculation unit 501 reads the block histogram of each spatial block from the block histogram memory 202 and calculates a cumulative histogram function of each spatial block. The cumulative histogram calculation unit 261 stores the calculated cumulative histogram function of each spatial block in the cumulative histogram memory 502.

The inverse function calculation unit 503 reads the cumulative histogram function of each spatial block from the cumulative histogram memory 502, calculates an inverse function (hereinafter, referred to as a cumulative histogram inverse function) of each cumulative histogram function, and stores the inverse function in the cumulative histogram inverse function memory 504.

The peak detection unit 505 reads the cumulative histogram function of each spatial block from the cumulative histogram memory 502. The peak detection unit 505 detects a position (hereinafter, referred to as a peak position) corresponding to a luminance value in which the corresponding block histogram becomes a maximum in the cumulative histogram function of each spatial block. The peak detection unit 505 stores a peak position list representing the coordinates of the detected peak position of each cumulative histogram function in the peak position list memory 506.

The luminance modulation function calculation unit 507 reads the peak position list of the cumulative histogram function of each spatial block from the peak position list memory 506. The luminance modulation function calculation unit 507 calculates a luminance modulation function for each spatial block based on the peak position list and stores the luminance modulation function in the luminance modulation function memory 508.

The mapping unit 509 reads the block histogram of each spatial block from the block histogram memory 202 and reads the luminance modulation function of each spatial block from the luminance modulation function memory 508. The mapping unit 509 calculates the frequency count corresponding to the representative value of the luminance value of each bin of each block histogram based on the luminance modulation function and supplies the frequency count to the mapping unit 510.

The mapping unit 510 reads the cumulative histogram inverse function of each spatial block from the cumulative histogram inverse function memory 504. The mapping unit 510 calculates the reference luminance value Lg(nl)(p) for each bin of each block histogram based on each cumulative histogram inverse function and the frequency count corresponding to the representative value of the luminance value of each bin of each block histogram. The mapping unit 510 supplies the calculated reference luminance value Lg(nl)(p) for each bin of each block histogram to the coefficient calculation unit 244.

[Description of Reference Luminance Value Calculation Processing]

Figure 26:
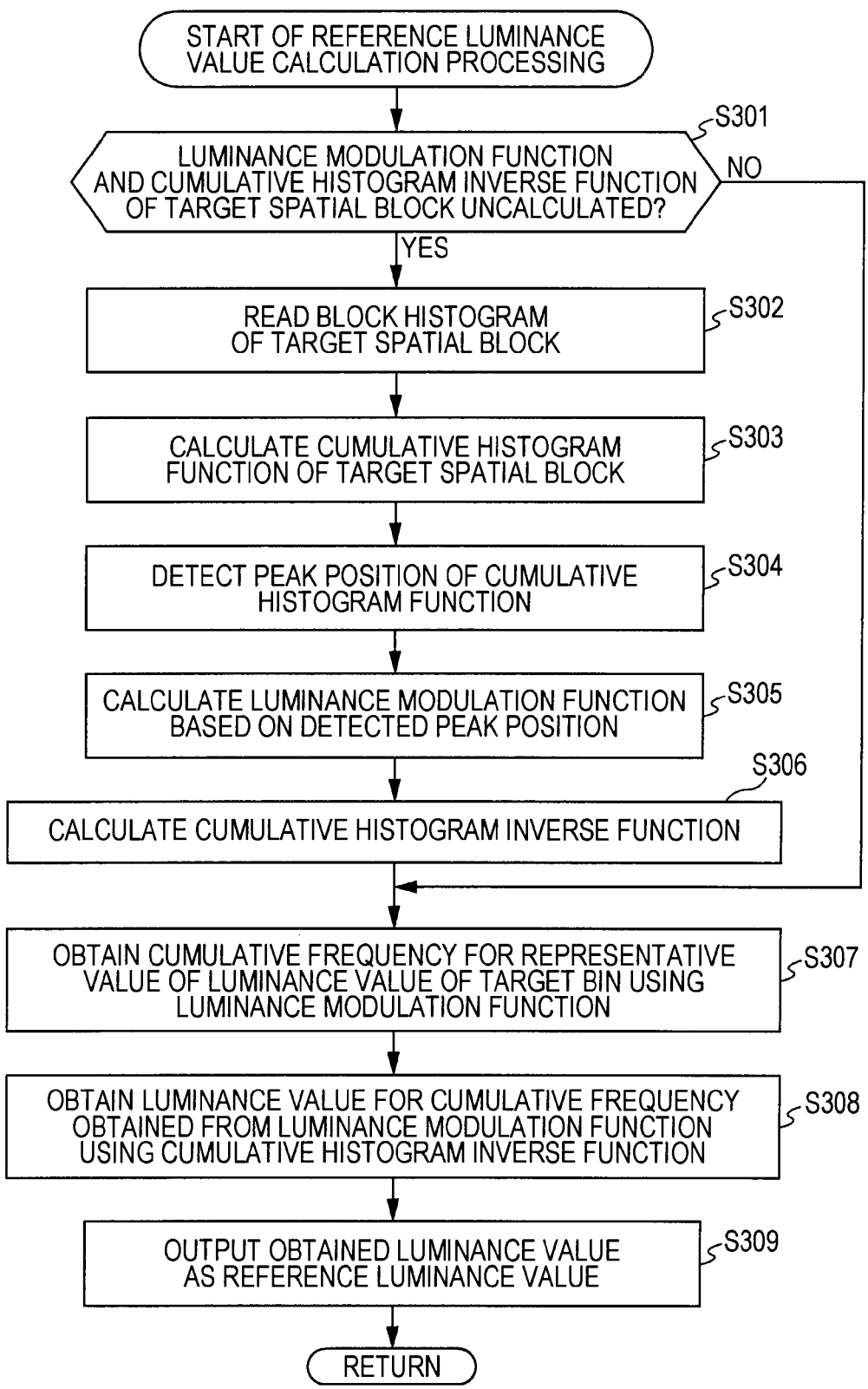
FIG. 26 is a flowchart illustrating reference luminance value calculation processing.

Next, the reference luminance value calculation processing of the case where the reference luminance value calculation unit 243 has the configuration shown in FIG. 25 will be described with reference to the flowchart of FIG. 26. In addition, the reference luminance value calculation processing corresponds to the processing of step S144 of FIG. 16.

In step S301, the cumulative histogram calculation unit 501 determines whether or not the luminance modulation function and the cumulative histogram inverse function of the target spatial block are uncalculated. If it is determined that the luminance modulation function and the cumulative histogram inverse function of the target spatial block are uncalculated, the processing progresses to step S302.

In step S302, the cumulative histogram calculation unit 501 reads the block histogram of the target spatial block from the block histogram memory 202.

Figure 18:
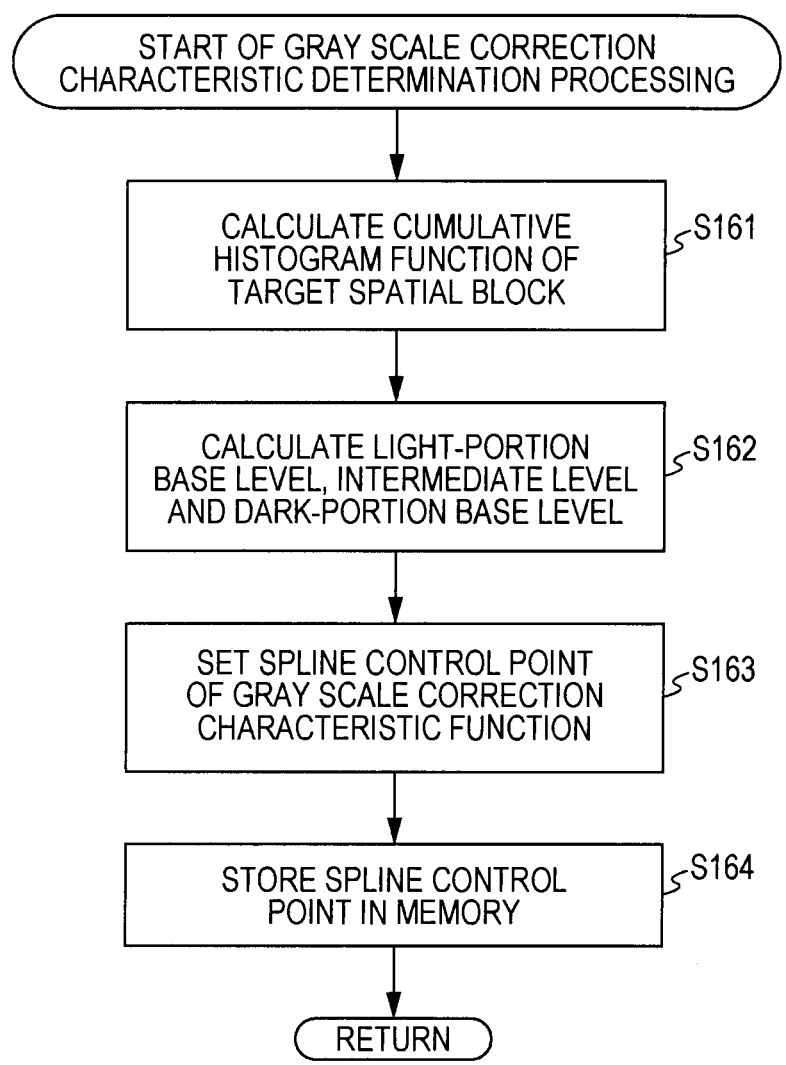
FIG. 18 is a flowchart illustrating a gray scale correction characteristic determination processing.

In step S303, the cumulative histogram calculation unit 501 calculates the cumulative histogram function of the target spatial block, similarly to the processing of step S161 of FIG. 18. The cumulative histogram calculation unit 501 stores the calculated cumulative histogram function in the cumulative histogram memory 502.

Hereinafter, the cumulative histogram function is represented by $y=f(x)$. x denotes a luminance and y denotes a cumulative frequency.

In step S304, the peak detection unit 505 detects the peak position of the cumulative histogram function. Specifically, the peak detection unit 505 reads the cumulative histogram function of the target spatial block from the cumulative histogram memory 502. The peak detection unit 505 detects a position where the gradient of the cumulative histogram function becomes a maximum and the gradient becomes greater than a predetermined threshold value as the peak position.

Figure 27:
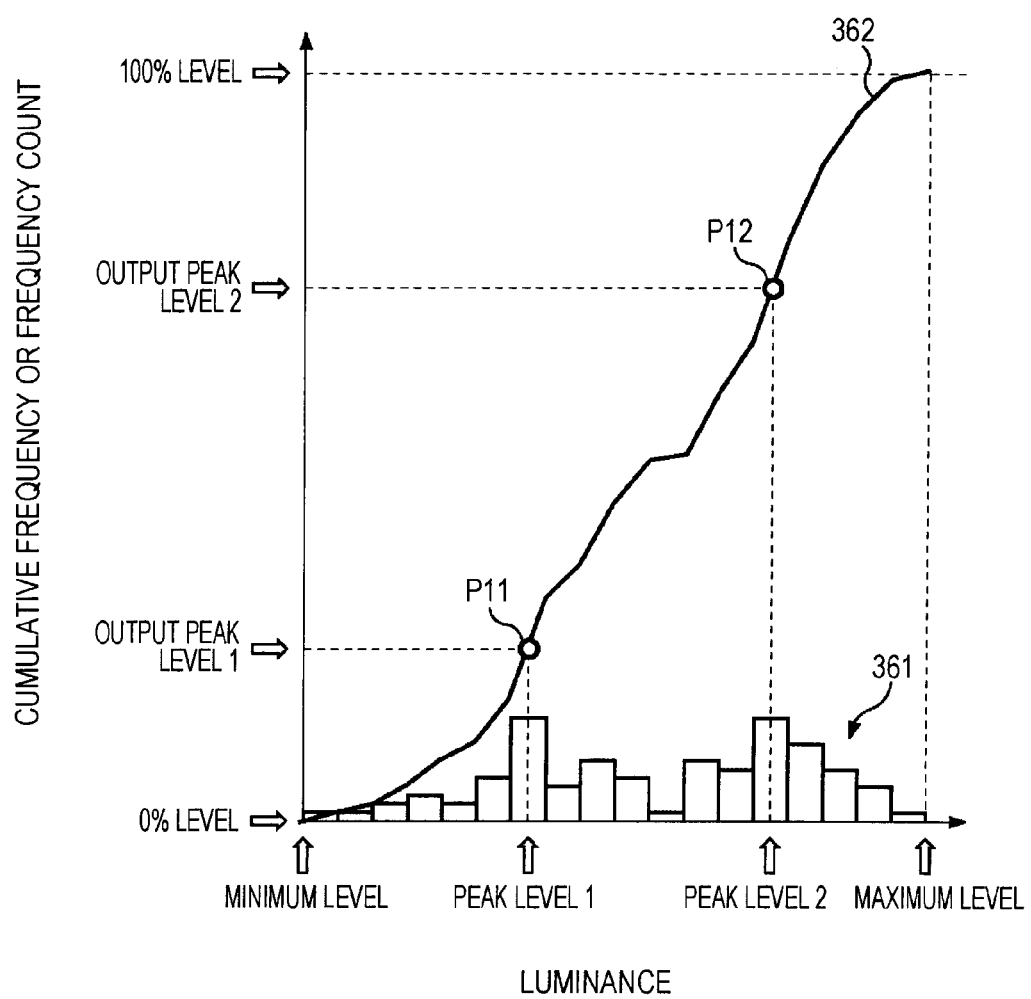
FIG. 27 is a diagram illustrating a method of detecting a peak position of a cumulative histogram function.

For example, FIG. 27 shows the same block histogram 361 and the cumulative histogram function 362 as FIG. 19. In this case, for example, a peak position P11 and a peak position P12 where the gradient of the cumulative histogram function 362 becomes a maximum and the gradient becomes greater than a predetermined threshold value are detected. A bin corresponding to the peak position P11 and the peak position P12 is a bin in which the frequency count becomes a maximum and the frequency count becomes greater than a predetermined threshold value in the block histogram 361. Accordingly, the peak position P11 and the peak position P12 become coordinates on the cumulative histogram function 362 corresponding to a luminance value in which the block histogram 361 becomes a maximum.

In addition, hereinafter, as shown in FIG. 27, the luminance value and the cumulative frequency of the peak position P11 are denoted by respectively a peak level 1 and an output peak level 1 and the luminance value and the cumulative frequency of the peak position P12 are denoted by respectively a peak level 2 and an output peak level 2.

The peak detection unit 505 stores a peak position list representing the coordinates of the detected peak positions in the peak position list memory 506.

In step S305, the luminance modulation function calculation unit 507 calculates the luminance modulation function based on the detected peak positions. Specifically, the luminance modulation function calculation unit 507 reads the peak position list from the peak position list memory 506. The luminance modulation function calculation unit 507 calculates a monotonically increasing function passing through a start point of the cumulative histogram function, the peak position detected by the peak detection unit 505 and an end point of the cumulative histogram function as the luminance modulation function. For example, a monotonically increasing spline function passing through the start point of the cumulative histogram function, the peak position and the end point of the cumulative histogram function is calculated as the luminance modulation function. The luminance modulation function calculation unit 507 stores the calculated luminance modulation function in the luminance modulation function memory 508.

Figure 28:
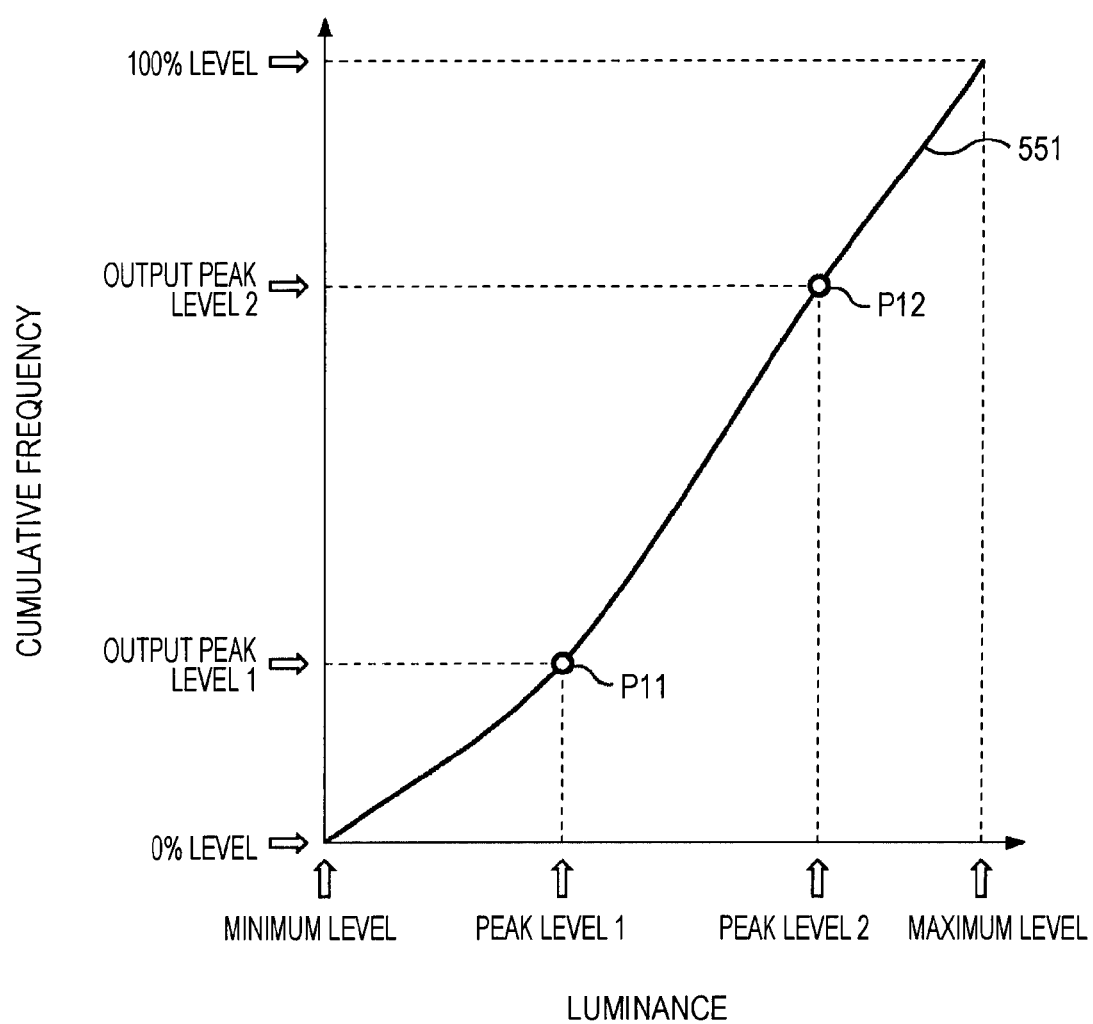
FIG. 28 is a graph showing an example of a luminance modulation function.

FIG. 28 shows an example of the luminance modulation function 551 for the cumulative histogram function 362 of FIG. 27. In addition, the horizontal axis of FIG. 28 denotes a luminance and the vertical axis thereof denotes a cumulative frequency. The luminance modulation function 551 is a smoothly monotonically increasing function passing through the start point and the end point of the cumulative histogram function, the peak position E11 and the peak position P12.

In addition, the luminance modulation function may pass through the vicinity of the peak position and may not necessarily pass through the coordinates of the peak position. The luminance modulation function may not necessarily be a smooth curved line in the meaning in which differentiation is continued if it is a monotonically increasing continuous function. However, since the function passes through the vicinity of the peak position, a smooth curved line which is not meandered more than necessary is more preferable. In addition, if a spline function is used, it is possible to easily obtain a curve line having such a property.

In step S306, the inverse function calculation function 503 calculates the cumulative histogram inverse function. Specifically, the inverse function calculation unit 503 reads the cumulative histogram function of the target spatial block from the cumulative histogram memory 502. In addition, the inverse function calculation unit 503 calculates the inverse function $x=f^{-1}(y)$ of the cumulative histogram function $y=f(x)$. The inverse function calculation unit 503 stores the calculated cumulative histogram inverse function in the cumulative histogram inverse function memory 504. Thereafter, the processing progresses to step S307.

Meanwhile, if it is determined that the luminance modulation function and the cumulative histogram inverse function of the target spatial block are calculated in step S301, the processing of steps S302 to S306 is skipped and the processing progresses to step S307.

In step S307, the mapping unit 509 obtains the cumulative frequency for the representative value of the luminance value of the target bin using the luminance modulation function. Specifically, the mapping unit 509 reads the luminance modulation function of the target spatial block from the luminance modulation function memory 508. The mapping unit 509 sets, for example, the central value of the luminance range of the target bin to the representative value of the luminance value of the target bin, assigns the representative value to the luminance modulation function, and obtains the cumulative frequency for the representative value. The mapping unit 509 supplies the obtained cumulative frequency to the mapping unit 510.

In step S308, the mapping unit 510 obtains the luminance value for the cumulative frequency obtained from the luminance modulation function using the cumulative histogram inverse function. Specifically, the mapping unit 510 reads the cumulative histogram inverse function of the target spatial block from the cumulative histogram inverse function memory 504. The mapping unit 510 assigns the cumulative frequency obtained by the mapping unit 509 to the cumulative histogram inverse function and obtains the luminance value for the cumulative frequency.

Now, a detailed example of the processing of steps S307 and S308 will be described with reference to FIG. 29.

Figure 29:
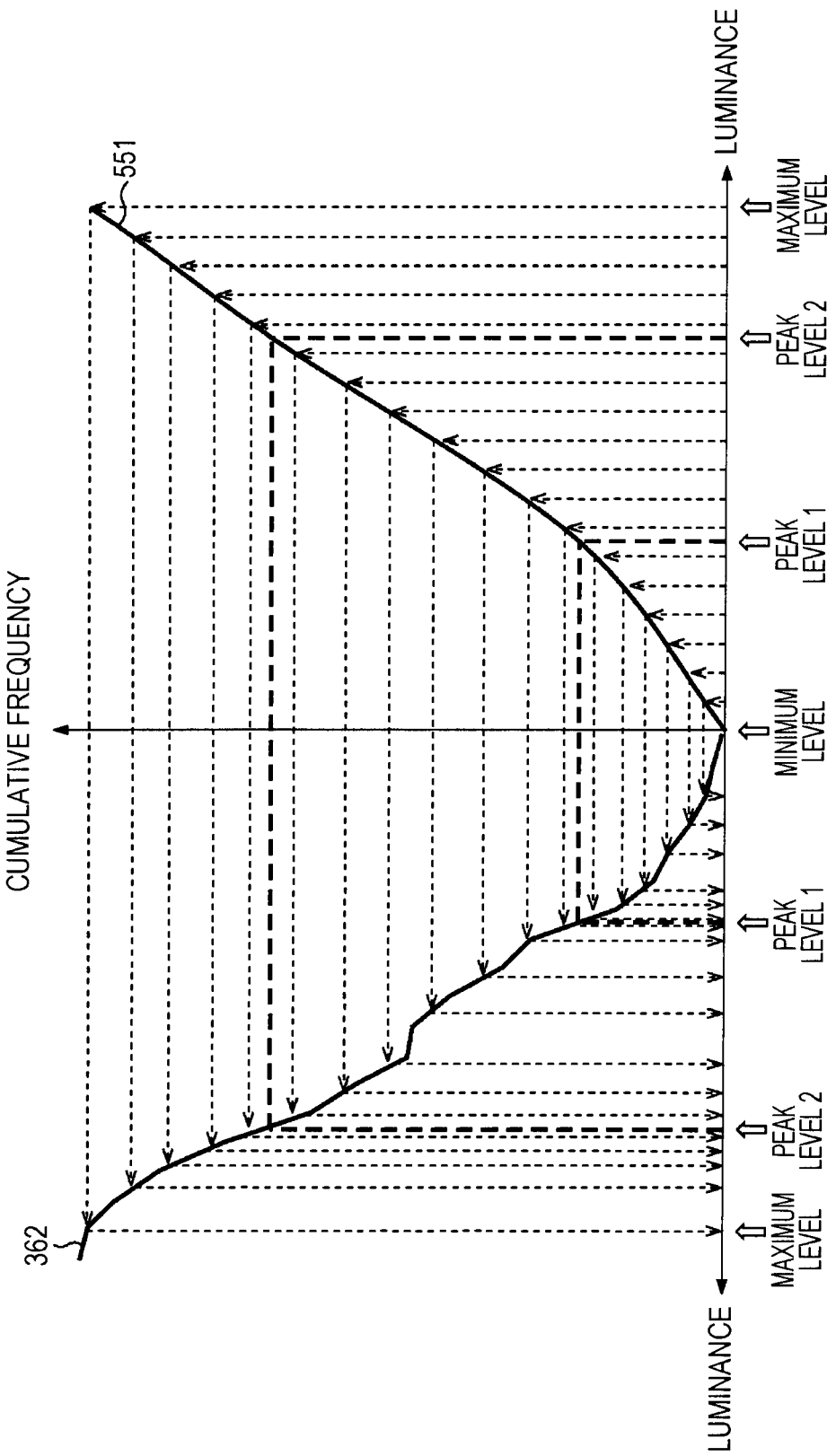
FIG. 29 is a diagram illustrating a method of calculating a reference luminance value.

FIG. 29 is a diagram in which two graphs are connected, the horizontal axis thereof denotes a luminance, and the vertical axis thereof denotes a cumulative frequency. A left side is a graph of the same luminance modulation function 551 as FIG. 28 and a right side is a graph in which the cumulative histogram function 362 of FIG. 27 is horizontally reversed. Accordingly, the direction of the horizontal axis of the left graph is opposite to the direction of the horizontal axis of the right graph.

As described above, in step S307, the cumulative frequency for the representative value of the luminance value of each bin of the target spatial block is assigned based on the luminance modulation function 551. For example, in the right graph of FIG. 29, the start point of each of the upward arrows arranged at the same interval in the luminance direction represent the representative value of the luminance value of each bin of the target spatial block. An intersection between a leftward arrow having a point in which the upward arrow collides with the luminance modulation function 551 as a start point and the axis in a cumulative frequency direction represents a cumulative frequency assigned to the representative value of the luminance value of each bin.

In addition, as described above, in step S308, the reference luminance value Lg(nl)(p) is assigned to the cumulative frequency assigned by the luminance gray scale function 551 based on the cumulative histogram inverse function. For example, in the left graph of FIG. 29, an intersection between a downward arrow having a point which a leftward arrow collides with the cumulative histogram function 362 as a start point and an axis of the luminance direction represents the reference luminance value Lg(nl)(p) assigned to each cumulative frequency.

As shown in FIG. 29, while the upward arrows are arranged at the same interval in the right graph, the downward arrows are densely arranged in the vicinities of the peak level 1 and the peak level 2. That is, if the luminance value (representative value in the left graph of the luminance value of each bin) before correction is close to the peak level 1 or the peak level 2, the reference luminance value Lg(nl)(p) having substantially the same value is assigned. In contrast, if the luminance value before correction is distant from the peak level 1 and the peak level 2, the reference luminance value Lg(nl)(p) is assigned so as to become close to the peak level 1 or the peak level 2. In addition, the reference luminance value Lg(nl)(p) is concentrated on the vicinities of the peak level 1 and the peak level 2.

In step S309, the mapping unit 510 outputs the obtained luminance value to the coefficient calculation unit 244 as the reference luminance value Lg(nl)(p) of the target bin.

Thereafter, the reference luminance value calculation processing is finished and the processing progresses to step S145 of FIG. 16.

In the third embodiment of the present invention, the processing other than the above-described reference luminance value calculation processing is equal to that of the first embodiment and the description thereof is repeated and thus will be omitted.

Effects of Third Embodiment

In the third embodiment of the present invention, similarly to the first embodiment and the second embodiment, the reference luminance value Lg(nl)(p) of the target bin becomes a value obtained by correcting the representative value of the luminance value of the target bin in a direction in which the frequency count of the block histogram of the target spatial block is increased when viewed from the target bin.

In addition, in the first embodiment of the present invention, it is necessary to perform one division operation for each bin of each block histogram, in order to calculate weighted average of the luminance value, in the calculation of the reference luminance value Lg(nl)(p). In contrast, in the third embodiment of the present invention, in the calculation of the reference luminance value Lg(nl)(p), a division operation is not necessary. Accordingly, according to the third embodiment of the present invention, it is possible to reduce the computational complexity as compared with the first embodiment.

4. Modified Example

Modified Example of Gray Scale Correction Characteristic Function

Although the example of calculating the gray scale correction characteristic function using only the block histogram of the corresponding spatial block for each spatial block is described in the above description, the block histogram of the adjacent spatial block may be used. For example, the gray scale correction characteristic function of the spatial block may be calculated using a block histogram obtained by synthesizing the block histogram of the corresponding spatial block and the block histogram of the adjacent spatial block. Accordingly, it is possible to increase the continuity of the gray scale correction characteristic between the corresponding spatial block and the adjacent spatial block.

Alternatively, the same gray scale correction characteristic function may be used in all or a part of spatial blocks. For example, a gray scale correction characteristic function which is shared among all spatial blocks may be calculated using a block histogram obtained by synthesizing block histograms of all spatial blocks. Alternatively, a fixed gray scale correction characteristic function which is prepared in advance may be used without referring to the block histogram.

[Modified Example of Method of Calculating Primary Differential Coefficient Function]

Although, in the second embodiment of the present invention, the example of calculating the primary differential coefficient function of the luminance direction using only the block histogram of the corresponding spatial block for each spatial block is described, the computation of the primary differential coefficient function is not limited to the luminance direction. For example, in order to increase the continuity of the reference luminance values of the corresponding spatial block and the adjacent spatial block, a primary differential coefficient function may be calculated in the spatial direction. In this case, the primary differential coefficient calculation unit 401 may calculate a three-dimensional primary differential coefficient vector in which the luminance direction and the spatial direction coincide and then may supply that obtained by projecting the vector to the luminance direction to the luminance correction amount calculation unit 402.

The method of using the three-dimensional primary differential coefficient is equivalent to the calculation of the primary differential coefficient of the luminance direction after the block histograms of the corresponding spatial block and the adjacent spatial block are synthesized using a smoothing filter of the spatial direction. Accordingly, the smoothing of the block histogram in the spatial direction may be first performed and then the reference luminance value calculation processing above-described with reference to FIG. 22 may be performed.

Although the Sobel operator is described as the detailed example of the operator used to calculate the primary differential coefficient function in the above description, other differential operators may be employed. For example, a filter convoluting a smoothing filter in the Sobel operator may be used and a primary differential coefficient function may be calculated while smoothing the block histogram in the luminance direction.

[Case of Performing Gray Scale Correction Processing with Respect to Image Signal after YC Transform Processing]

Although gray scale correction processing is performed with respect to the RGB image in the above description, gray scale correction processing may be performed with respect to the image signal after the YC transform processing. In this case, the DSP 116 has, for example, the configuration shown in FIG. 30. In addition, in FIG. 30, the parts corresponding to the case of FIG. 3 are denoted by the same reference numerals and the description thereof will be appropriately omitted.

Figure 30:
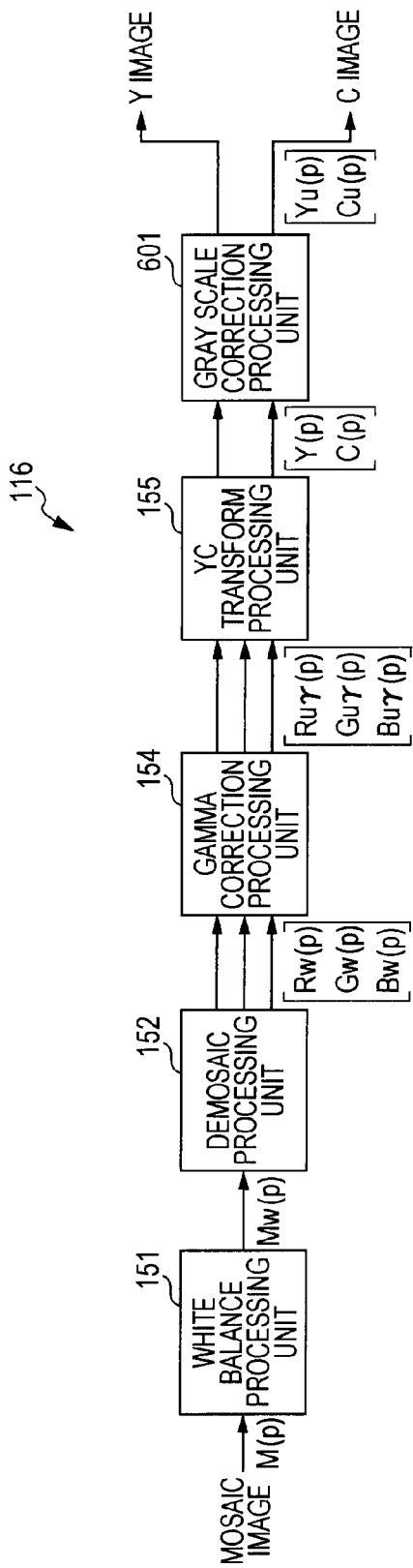
FIG. 30 is a diagram showing a second configuration example of a DSP block.

The DSP 116 shown in FIG. 30 is different from the DSP 116 of FIG. 3 in that the gray scale correction processing unit 153 is not provided between the demosaic processing unit 152 and the gamma correction processing unit 154 and the gray scale correction processing unit 601 is connected to the YC transform processing unit 155. The gray scale correction processing unit 601 performs gray scale correction processing with respect to the Y image and the C image (Cb component and Cr component) supplied from the YC transform processing unit 155 and supplies the Y image and the C image subjected to gray scale correction processing to the LCD driver 118 or the CODEC 120 as necessary.

In addition, hereinafter, the pixel value of the pixel position p of the image data subjected to gray scale correction processing is denoted by [Yu(p), Cu(p)]. Here, Yu(p) denotes the value of the luminance component of the Y image and Cu(p) denotes the value of the color difference component of the C image. Hereinafter, in particular, the Cb component of the pixel value Cu(p) of the C image is denoted by Cbu(p) and the Cr component thereof is denoted by Cru(p).

Figure 31:
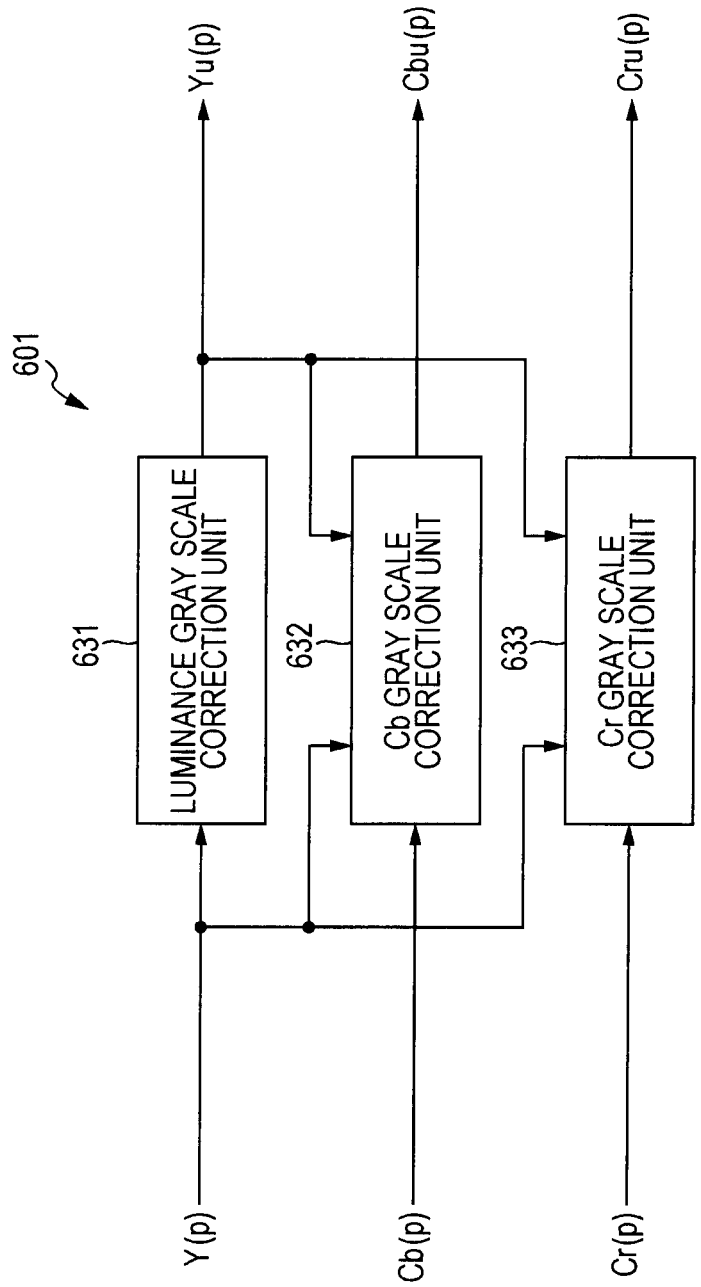
FIG. 31 is a diagram showing a second configuration example of a gray scale correction processing unit.

The gray scale correction processing unit 601 of FIG. 30 has, for example, the configuration shown in FIG. 31. That is, the gray scale correction processing unit 601 includes a luminance gray scale correction unit 631, a Cb gray scale correction unit 632 and a Cr gray scale correction unit 633.

The luminance gray scale correction unit 631 performs the same processing as the luminance gray scale correction unit 183 of FIG. 5 and corrects (compresses) the gray scale of the pixel value Y(p) of the Y image from the YC transform processing unit 155. The luminance gray scale correction unit 631 supplies the pixel value Yu(p) obtained by gray scale correction to the LCD driver 118 or the CODEC 120 as necessary and supplies the pixel value Yu(p) to the Cb gray scale correction unit 632 and the Cr gray scale correction unit 633.

The Cb gray scale correction unit 632 performs the same processing as the gray scale correction unit 185 of FIG. 5 using the pixel value Y(p) of the Y image from the YC transform processing unit 155 and the pixel value Yu(p) of the Y image from the luminance gray scale correction unit 631, corrects the gray scale of the pixel value Cb(p) of the C image from the YC transform processing unit 155, and supplies the pixel value Cbu(p), the gray scale of which is corrected, to the LCD driver 118 or the CODEC 120 as necessary.

The Cr gray scale correction unit 633 performs the same processing as the gray scale correction unit 185 of FIG. 5 using the pixel value Y(p) of the Y image from the YC transform processing unit 155 and the pixel value Yu(p) of the Y image from the luminance gray scale correction unit 631, corrects the gray scale of the pixel value Cr(p) of the C image from the YC transform processing unit 155, and supplies the pixel value Cru(p), the gray scale of which is corrected, to the LCD driver 118 or the CODEC 120 as necessary.

For example, the gray scale correction performed by the Cb gray scale correction unit 632 and the Cr gray scale correction unit 633 is performed by multiplying the ratio of the pixel value Yu(p) of the Y image, the gray scale of which is corrected, to the pixel value Y(p) of the Y image by the pixel value (pixel value Cr(p) or the pixel value Cb(p)) of the C image, similarly to the computation shown in Equation (1). That is, a value obtained by dividing the pixel Yu(p) by the pixel value Y(p) is multiplied by the pixel value of the C image.

Since the Y image and the C image, that is, the luminance signal and the color difference signal are input to the gray scale correction processing unit 601, the gray scale correction processing unit 601 may not generate the luminance image. In addition, since the Y image and the C image supplied to the gray scale correction processing unit 601 are already gamma-corrected, the Y image and the C image may not be non-linearly transformed. Accordingly, the blocks corresponding to the luminance calculation unit 181, the non-linear transform unit 182, the non-linear transform unit 184 and the non-linear inverse transform unit 186 of the gray scale correction processing unit 153 of FIG. 5 are not provided in the gray scale correction processing unit 601.

In this way, by performing the gray scale correction processing with respect to the Y image and the C image, it is possible to simply perform gray scale correction.

[Case of Performing Gray Scale Correction Processing with Respect to RAW Data]

In addition, gray scale correction processing may be performed with respect to RAW data, that is, the mosaic image. In this case, the DSP 116 has, for example, the configuration shown in FIG. 32. In addition, in FIG. 32, the parts corresponding to the case of FIG. 3 are denoted by the same reference numerals and the description thereof will be appropriately omitted.

Figure 32:
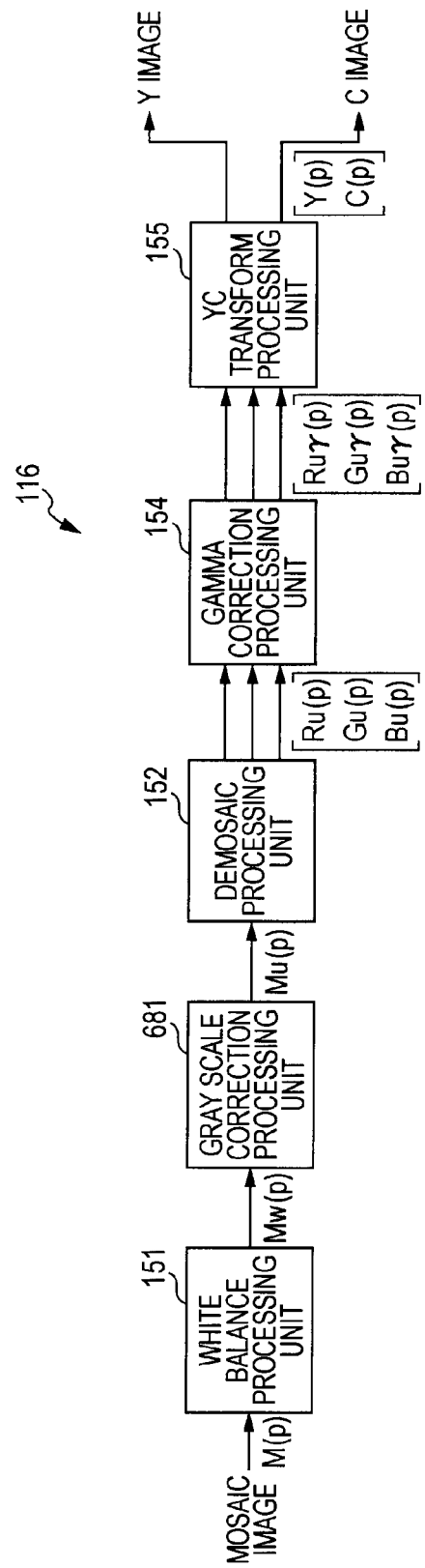
FIG. 32 is a diagram showing a third configuration example of a DSP block.

The DSP 116 shown in FIG. 32 is different from the DSP 116 of FIG. 3 in that the gray scale correction processing unit 681 is provided between the white balance processing unit 151 and the demosaic processing unit 152 in the DSP 116 shown in FIG. 32. That is, while the gray scale correction processing unit 153 is provided between the white balance processing unit 151 and the gamma correction processing unit 154 in the DSP 116 of FIG. 3, the gray scale correction processing unit 681 corresponding to the gray scale correction processing unit 153 of FIG. 3 is provided between the white balance processing unit 151 and the demosaic processing unit 152 in the DSP 116 of FIG. 32.

Figure 33:
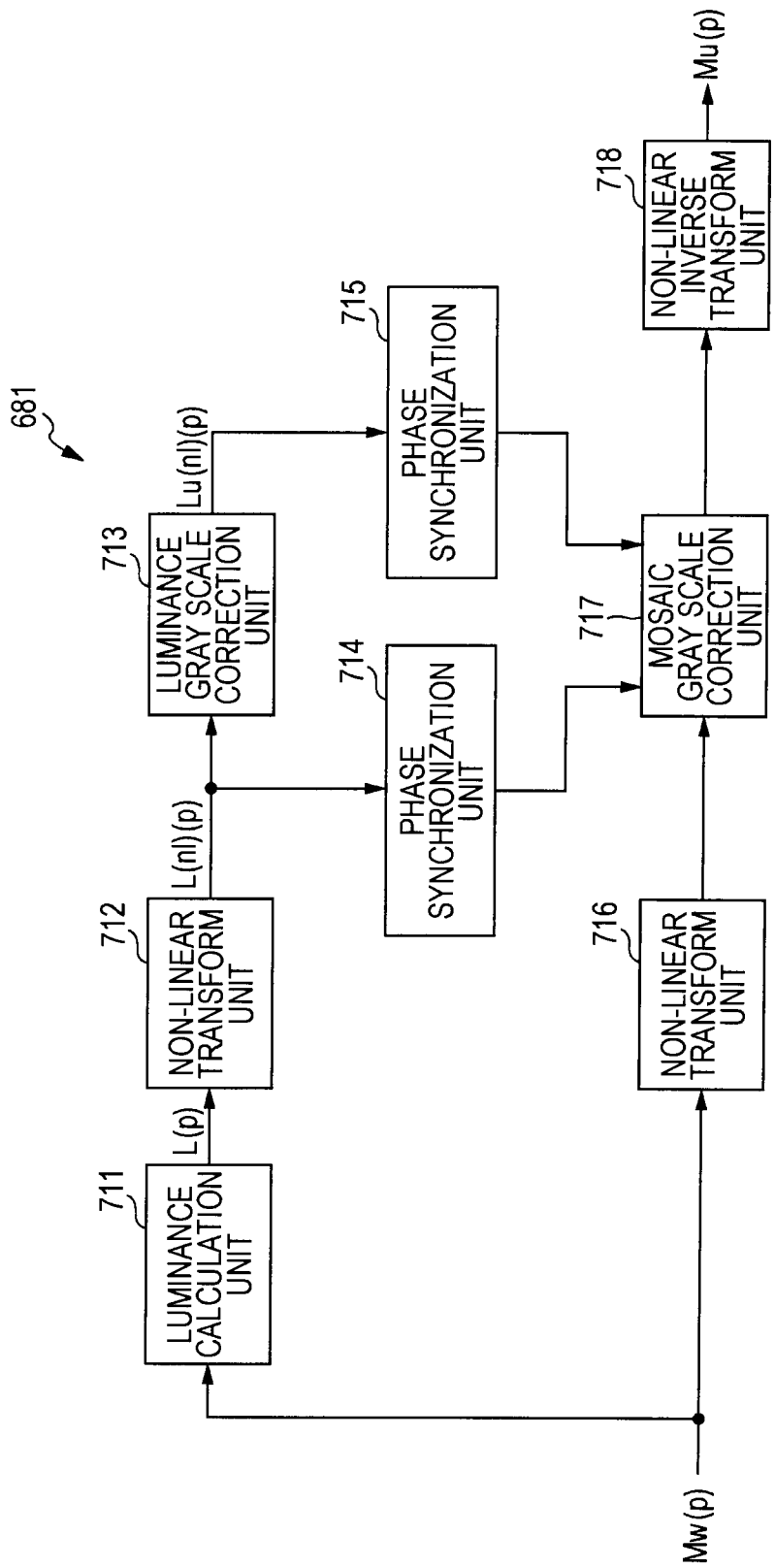
FIG. 33 is a diagram showing a third configuration example of a gray scale correction processing unit.

The gray scale correction processing unit 681 performs gray scale correction processing with respect to the mosaic image Mw from the white balance processing unit 151 and supplies the mosaic image Mu subjected to the gray scale correction processing to the demosaic processing unit 152. This gray scale correction processing unit 681 has, for example, the configuration shown in FIG. 33.

Specifically, the gray scale correction processing unit 681 includes a luminance calculation unit 711, a non-linear transform unit 712, a luminance gray scale correction unit 713, a phase synchronization unit 714, a phase synchronization unit 715, a non-linear transform unit 716, a mosaic gray scale correction unit 717, and a non-linear inverse transform unit 718.

The luminance calculation unit 711 performs the same processing as the luminance calculation unit 181 FIG. 5 and generates a luminance image from the mosaic image Mw. That is, the luminance calculation unit 711 calculates the luminance value L(p) from several pixel values of the mosaic image Mw using the pixel value of the pixel position p of the mosaic image Mw from the white balance processing unit 151 as the pixel value Mw(p) of the target pixel and supplies the luminance value to the non-linear transform unit 712.

Figure 34:
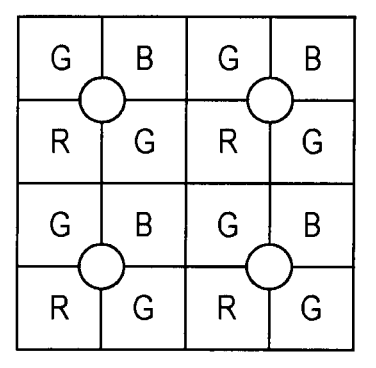

Since each pixel of the mosaic image Mw has, for example, only the pixel value of any one of R, G (Gr or Gb) and B components as shown in FIG. 34, the luminance calculation unit 711 calculates the luminance value by referring to not only the supplied pixel value Mw(p) of one pixel but also the pixel values of the pixels adjacent to that pixel.

In FIG. 34, pixels having the R component, G component and the B component are arranged in the Bayer array and one rectangle denotes one pixel of a mosaic image. In the figure, characters "R", "G" and "B" in the rectangles indicates that the rectangles are the pixels having the pixel values of the R component, the G component and the B component.

Using that the pixel values of the components including the R component, the G component (Gr component and Gb component) and the B component are obtained when a total of four pixels of mutually adjacent 2 pixels×2 pixels is a processed unit, the luminance calculation unit 711 obtains the luminance value of the position represented by a circle in the figure based on the pixel values of four pixels. That is, in the figure, the luminance signal is generated as a sum of the RGB signal of four pixels adjacent to the position of the circle.

In the example of FIG. 34, the circle of the figure is located on the center of the region including the R pixel, the B pixel and two G pixels. In addition, the position where the luminance value is obtained may be a deviated position from the position of the pixel of the mosaic image by a half pixel and the interval between positions where the luminance value is obtained may not be one pixel unit. However, such a position (phase) difference is not problem in the correction of the gray scale of the luminance value.

Returning to FIG. 33, the non-linear transform unit 712 performs the same processing as the non-linear transform unit 182 of FIG. 5, non-linearly transforms the luminance value L(p) from the luminance calculation unit 711, and supplies the luminance value L(nl)(p) obtained by non-linear transform to the luminance gray scale correction unit 713 and the phase synchronization unit 714.

The luminance gray scale correction unit 713 performs the same processing as the luminance gray scale correction unit 183 of FIG. 5, compresses the gray scale of the luminance value L(nl)(p) from the non-linear transform unit 712, performs the gray scale correction of the luminance value L(nl)(p), and supplies the luminance value Lu(nl)(p) obtained by the gray scale correction to the phase synchronization unit 715.

The phase synchronization unit 714 performs an interpolation processing using several luminance values of the position adjacent to the target pixel among the luminance values from the non-linear transform unit 712 and calculates the luminance value of the position of the target pixel. The interpolation processing performed by the phase synchronization unit 714 is, for example, a binary interpolation processing using a total of four luminance values of the pixels of 2×2 positions adjacent to the target pixel.

The phase synchronization unit 714 supplies the obtained luminance value to the mosaic gray scale correction unit 717, if the luminance value of the target pixel is obtained.

The phase synchronization unit 715 performs an interpolation processing using several luminance values of the position adjacent to the target pixel among the luminance values from the luminance gray scale correction unit 713 and calculates the luminance value, the gray scale of which is corrected, of the position of the target pixel. The interpolation processing performed by the phase synchronization unit 715 is the same processing as the interpolation processing performed by the phase synchronization unit 714 and is, for example, a binary interpolation processing or the like.

The non-linear transform unit 716 performs the same processing as the non-linear transform unit 184 of FIG. 5, non-linearly transforms the pixel value Mw(p) of the target pixel from the white balance processing unit 151, and supplies the non-linearly transformed pixel value to the mosaic gray scale correction unit 717.

The mosaic gray scale correction unit 717 performs the same processing as the gray scale correction unit 185 of FIG. 5 using the luminance value from the phase synchronization unit 714 and the luminance value, the gray scale of which is corrected, from the phase synchronization unit 715, corrects the gray scale of the pixel value from the non-linear transform unit 716, and supplies the pixel value, the gray scale of which is corrected, to the non-linear inverse transform unit 718. For example, in the same manner as calculated in the above-described Equation (1), the mosaic gray scale correction unit 717 multiplies a value obtained by dividing the luminance value, the gray scale of which is corrected, from the phase synchronization unit 715 by the luminance value from the phase synchronization unit 714 by the pixel value from the non-linear transform unit 716, thereby correcting the gray scale of the pixel value. Accordingly, the gray scale of the pixel value of the target pixel, that is, the pixel value of the R, G or B component, is corrected.

The non-linear inverse transform unit 718 performs non-linear inverse transform, which is inverse transform of non-linear transform of the non-linear transform unit 716, with respect to the pixel value from the mosaic gray scale correction unit 717. The non-linear inverse transform unit 718 supplies the pixel value Mu(p) obtained by non-linear inverse transform to the demosaic processing unit 152.

In this way, if the gray scale correction processing is performed with respect to the mosaic image, the position of the luminance value calculated by the luminance calculation unit 711 is different from the position of the target pixel of the mosaic image. However, by performing phase synchronization using the phase synchronization unit 714 and the phase synchronization unit 715, it is possible to obtain the luminance value of the position of the target pixel.

[Example of Application Range of the Invention]

As described above, the digital video camera of FIG. 2 performs image processing of extracting the general structure of the image. Since the information extracted by such image processing may be used in processing of improving image quality or the like, as the apparatus in which a block for extracting the general structure of the image is mounted, other apparatuses may be used in addition to a digital video camera. For example, as such apparatuses, an imaging apparatus such as a digital camera, a display apparatus such as a printer, a display, or the like is considered. In addition, the present invention is applicable to an apparatus for processing or editing an image or a computer program.

[Configuration Example of Hardware of Computer]

The above-described series of processing may be executed by hardware or software. If the series of processes is executed by software, a program configuring the software is installed in a computer in which dedicated hardware is mounted or, for example, a general-purpose personal computer which is capable of executing a variety of functions by installing various types of programs, from a program recording medium.

Figure 35:
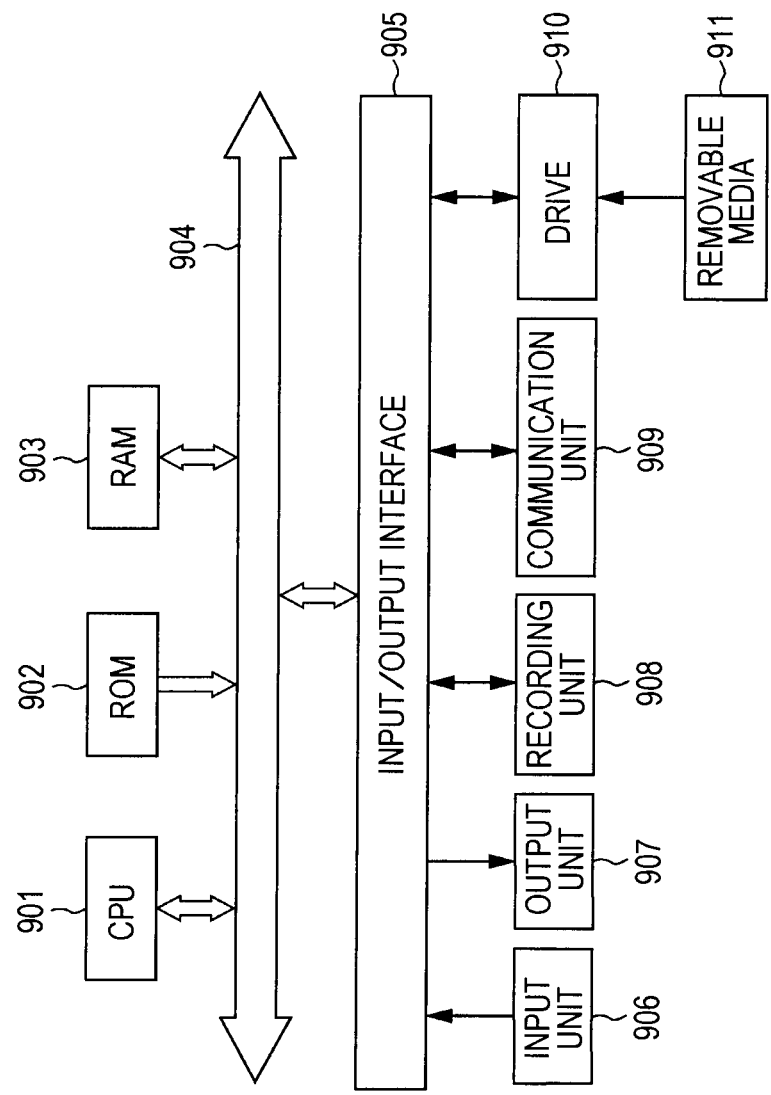
FIG. 35 is a block diagram showing a configuration example of a computer.

FIG. 35 is a block diagram showing the hardware configuration example of a computer for executing the above-described series of processes by a program.

In the computer, a Central Processing Unit (CPU) 901, a Read Only Memory (ROM) 902 and a Random Access Memory (RAM) 903 are connected to each other by a bus 904.

An input/output interface 905 is connected to the bus 904. An input unit 906 including a keyboard, a mouse, a microphone and the like, an output unit 907 including a display, a speaker and the like, and a recording unit 908 including a hard disk, non-volatile memory and the like, a communication unit 909 including a network interface and the like, and a drive 910 for driving a removable media 911 such as a magnetic disk, an optical disc, a magneto-optical disk and a semiconductor memory are connected to the input/output interface 905.

In the computer having the above configuration, the CPU 901 loads and executes, for example, the program recorded on the recording unit 908 to the RAM 903 through the input/output interface 905 and the bus 904, thereby performing the above-described series of processes.

The program executed by the computer (CPU 901) is recorded, for example, on the removable media 911 which is a package media including a magnetic disk (including a flexible disk), an optical disc (a Compact Disc-Read Only Memory (CD-ROM), a Digital Versatile Disc (DVD), or the like), a magnetooptical disk, a semiconductor memory or the like, or is provided through a wired or wireless transfer medium such as a local area network, the Internet and a digital satellite broadcast.

The program may be installed in the recording unit 908 through the input/output interface 905 by mounting the removable media 911 in the drive 910. The program may be received by the communication unit 909 through the wired or wireless transfer medium and installed in the recording unit 908. The program may be installed in the ROM 902 or the recording unit 908 in advance.

The program executed by the computer may be a program for performing a process in time series in the order described in the present specification or a program for performing a process at necessary timings such as upon calling or in parallel.

The present application contains subject matter related to that disclosed in Japanese Priority Patent Application JP 2010-053864 filed in the Japan Patent Office on Mar. 10, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a histogram calculation means for calculating a histogram of a luminance value for each spatial block obtained by dividing an input image in a spatial direction;
a gray scale correction coefficient calculation means for calculating a gray scale correction coefficient used for correction of the gray scale of a luminance value for each bin of the histogram; and
a gray scale correction means for performing gray scale correction of a luminance value of a target pixel based on the gray scale correction coefficient of the bin to which the target pixel of the input image belongs and the gray scale correction coefficient of a bin adjacent to the bin to which the target pixel belongs in the spatial direction and a luminance direction.

2. The image processing apparatus according to claim 1, wherein the gray scale correction coefficient calculation means includes:
a reference luminance value calculation means for calculating a luminance value obtained by correcting a representative value of the luminance value of the bin in a direction in which a frequency count of the histogram is increased when viewed from the corresponding bin, as a reference luminance value for each bin; and
a coefficient calculation means for calculating the gray scale correction coefficient for each bin, based on an output luminance value for the reference luminance value of a predetermined gray scale correction characteristic function for outputting an output luminance value, in which the gray scale of an input luminance value is corrected, and the reference luminance value.

3. The image processing apparatus according to claim 2, wherein the reference luminance value calculation means calculates a barycenter of the luminance value of the corresponding bin as the reference luminance value based on the frequency count of the corresponding bin and the frequency count of the bin adjacent to the corresponding bin in the spatial direction and the luminance direction.

4. The image processing apparatus according to claim 2, wherein the reference luminance value calculation means calculates a primary differential coefficient of the luminance direction of the histogram and calculates the luminance value obtained by correcting the representative value of the luminance value of the corresponding bin in the direction in which the frequency count of the histogram is increased when viewed from the bin based on the primary differential coefficient, as the reference luminance value.

5. The image processing apparatus according to claim 2, wherein the reference luminance value calculation means calculates a cumulative histogram function for the histogram and an inverse function of the cumulative histogram function, for each spatial block, calculates a monotonically increasing function passing through the vicinity of the coordinates of the cumulative histogram function for a luminance value in which the histogram becomes a maximum and the minimum value and the maximum value of a luminance value, as a luminance modulation function, for each spatial block, and calculates the reference luminance value by correcting the representative value of the luminance value of the corresponding bin based on the luminance modulation function and the inverse function of the cumulative histogram function.

6. The image processing apparatus according to claim 2, wherein the coefficient calculation means calculates the gray scale correction characteristic function passing through the coordinates in which a predetermined output luminance value is assigned to a luminance value in which the cumulative count of the histogram becomes a predetermined value and a minimum value and a maximum value of a luminance value.

7. The image processing apparatus according to claim 1, wherein the gray scale correction means interpolates the gray scale correction coefficient of the luminance value and the position of the target pixel based on the gray scale correction coefficients of the bin to which the target pixel belongs and the bin adjacent to the bin to which the target pixel belongs in the spatial direction and the luminance direction and performs gray scale correction of the luminance value of the target pixel based on the interpolated gray scale correction coefficient.

8. An image processing method of an image processing apparatus for performing gray scale correction of a luminance value of an input image, comprising the steps of:

calculating a histogram of a luminance value for each spatial block obtained by dividing the input image in a spatial direction;

calculating a gray scale correction coefficient used for correction of the gray scale of a luminance value for each bin of the histogram; and performing gray scale correction of a luminance value of a target pixel based on the gray scale correction coefficient of the bin to which the target pixel of the input image belongs and the gray scale correction coefficient of a bin adjacent to the bin to which the target pixel belongs in the spatial direction and a luminance direction.

9. A non-transitory computer-readable medium embodying a computer program for executing, on a computer, a process comprising the steps of:

calculating a histogram of a luminance value for each spatial block obtained by dividing the input image in a spatial direction;

calculating a gray scale correction coefficient used for correction of the gray scale of a luminance value for each bin of the histogram; and performing gray scale correction of a luminance value of a target pixel based on the gray scale correction coefficient of the bin to which the target pixel of the input image belongs and the gray scale correction coefficient of a bin adjacent to the bin to which the target pixel belongs in the spatial direction and a luminance direction.

10. An image processing apparatus comprising:

a histogram calculation unit configured to calculate a histogram of a luminance value for each spatial block obtained by dividing an input image in a spatial direction;

a gray scale correction coefficient calculation unit configured to calculate a gray scale correction coefficient used for correction of a gray scale of a luminance value for each bin of the histogram; and a gray scale correction unit configured to perform gray scale correction of a luminance value of a target pixel based on the gray scale correction coefficient of the bin to which the target pixel of the input image belongs and the gray scale correction coefficient of a bin adjacent to the bin to which the target pixel belongs in the spatial direction and a luminance direction.

* * * * *